US012682775B2

(12) United States Patent
Ben-Elazar et al.

(10) Patent No.: US 12,682,775 B2
(45) Date of Patent: Jul. 14, 2026

(54) CHAT CARD ENGINE(S) FOR CONVERSATIONAL CHAT CARDS

(71) Applicant: Microsoft Technology Licensing, LLC, Redmond, WA (US)

(72) Inventors: Shay Ben-Elazar, Herzliya (IL); Ella Ben Tov, Tel Aviv (IL); Yonatan Turkin, Givatayim (IL); Daniel Sitton, Tel Aviv (IL); Merav Mofaz, Tel Aviv (IL); Ori Bar-Ilan, Even Yehuda (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 16 days.

(21) Appl. No.: 18/444,117

(22) Filed: Feb. 16, 2024

(65) Prior Publication Data

US 2025/0265939 A1     Aug. 21, 2025

(51) Int. Cl.
| | |
|---|---|
| *G09B 7/02* | (2006.01) |
| *G06F 16/903* | (2019.01) |
| *G09B 3/02* | (2006.01) |
| *H04L 51/02* | (2022.01) |

(52) U.S. Cl.
CPC ......... *G09B 3/02* (2013.01); *G06F 16/90335* (2019.01); *H04L 51/02* (2013.01)

(58) Field of Classification Search
CPC ................................... G09B 7/02; G09B 7/04
See application file for complete search history.

(56) References Cited

U.S. PATENT DOCUMENTS

| | | | | |
|---|---|---|---|---|
| 12,249,253 | B1 * | 3/2025 | Richter | G10L 15/22 |
| 2004/0018479 | A1 * | 1/2004 | Pritchard | G09B 5/00 |
| | | | | 434/350 |
| 2004/0219494 | A1 * | 11/2004 | Boon | G09B 5/065 |
| | | | | 434/156 |
| 2005/0003337 | A1 * | 1/2005 | Berman | G09B 7/02 |
| | | | | 434/323 |
| 2011/0123967 | A1 * | 5/2011 | Perronnin | G09B 17/003 |
| | | | | 434/362 |
| 2013/0149681 | A1 * | 6/2013 | Tinkler | G09B 19/00 |
| | | | | 434/167 |
| 2016/0225278 | A1 * | 8/2016 | Leddy | G09B 7/06 |
| 2017/0293845 | A1 * | 10/2017 | McAllister | H04L 47/10 |
| 2021/0082419 | A1 * | 3/2021 | Tran | G09B 7/00 |

* cited by examiner

*Primary Examiner* — Peter R Egloff

(57) ABSTRACT

Systems and methods for providing adaptive and conversational chat cards are provided herein. For example, a method may include receiving, from a client device, an indication to start a chat card exercise, determining, by a chat card engine, a source document based on the chat card exercise, and generating chat cards based on the source document. Each of the chat cards may correspond to a subtopic present in the source document. As such, the chat card engine may generate a first prompt based on a first subtopic and provide the first prompt within a first chat card to the client device. The chat card engine may receive a first query from the client device responsive to the first prompt and determine an understanding score. The chat card engine may then generate a second prompt based on the understanding score and provide the second prompt in the first chat card.

20 Claims, 16 Drawing Sheets

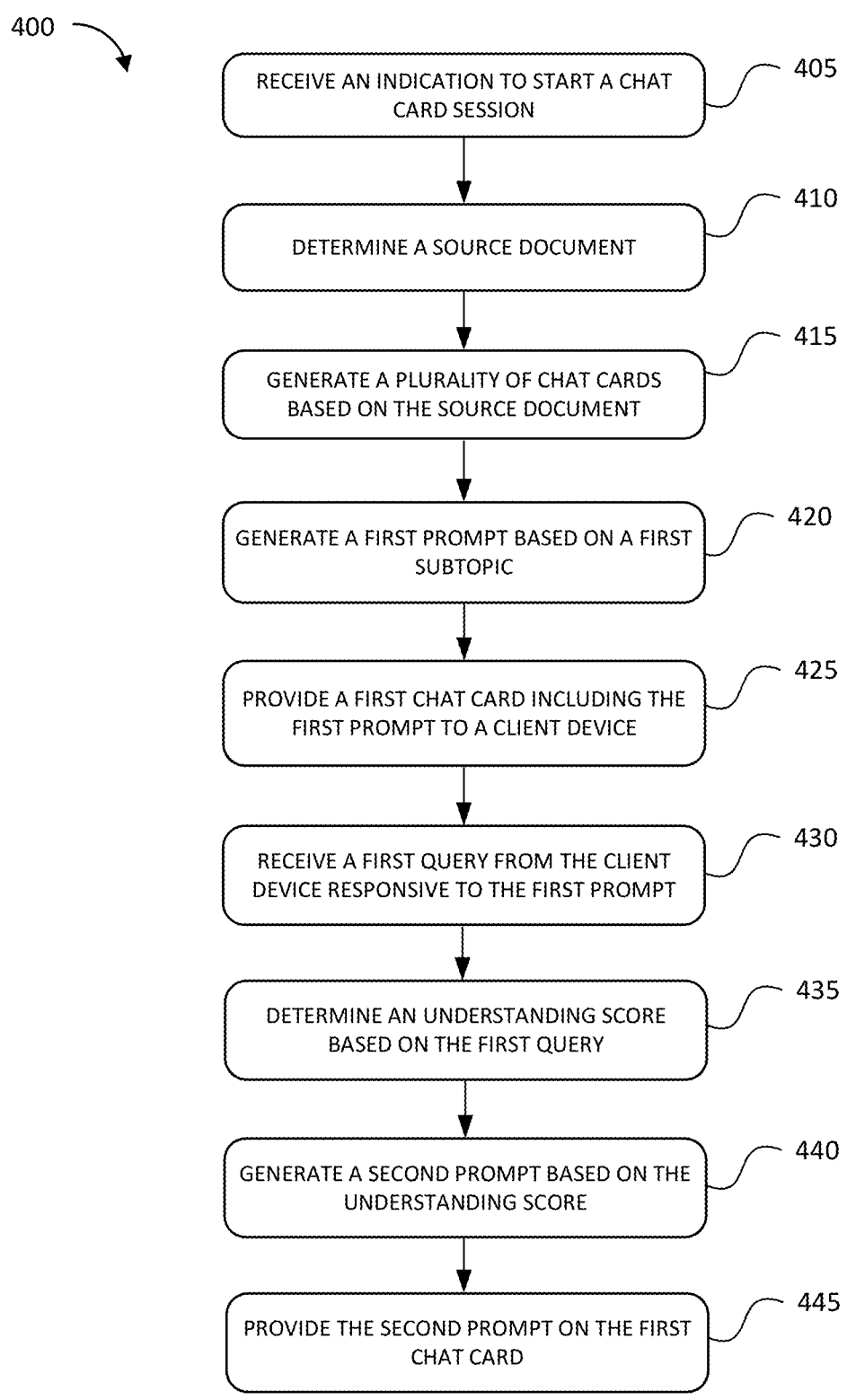

400

RECEIVE AN INDICATION TO START A CHAT CARD SESSION ⌐ 405

DETERMINE A SOURCE DOCUMENT ⌐ 410

GENERATE A PLURALITY OF CHAT CARDS BASED ON THE SOURCE DOCUMENT ⌐ 415

GENERATE A FIRST PROMPT BASED ON A FIRST SUBTOPIC ⌐ 420

PROVIDE A FIRST CHAT CARD INCLUDING THE FIRST PROMPT TO A CLIENT DEVICE ⌐ 425

RECEIVE A FIRST QUERY FROM THE CLIENT DEVICE RESPONSIVE TO THE FIRST PROMPT ⌐ 430

DETERMINE AN UNDERSTANDING SCORE BASED ON THE FIRST QUERY ⌐ 435

GENERATE A SECOND PROMPT BASED ON THE UNDERSTANDING SCORE ⌐ 440

PROVIDE THE SECOND PROMPT ON THE FIRST CHAT CARD ⌐ 445

*FIG. 4*

Intro to Photosynthesis

660

662

686

Question #1
What is photosynthesis?

688

Sure, I'd be happy to help! Think about plants and how they are able to produce their own food.

681

Give me a hint

684

Photosynthesis is how plants convert sunlight to glucose

690

I don't know

664

Type answer here

→  1/20

Your progress will be shared with Deb Patil

634

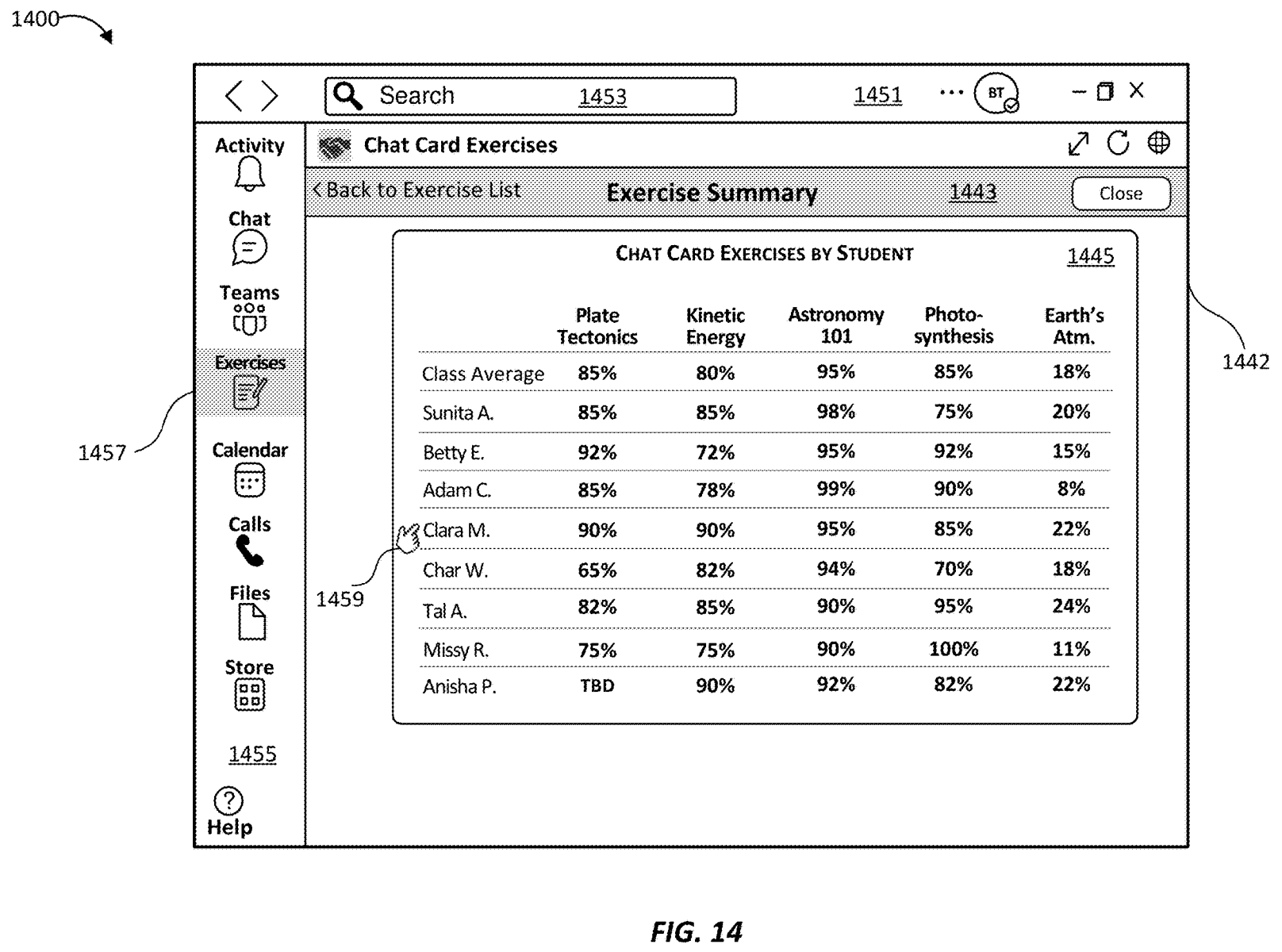

Chat Card Exercises

‹ Back to Exercise List    Exercise Summary    1443

CHAT CARD EXERCISES BY STUDENT

| | Plate Tectonics | Kinetic Energy | Astronomy 101 | Photo-synthesis | Earth's Atm. |
|---|---|---|---|---|---|
| Class Average | 85% | 80% | 95% | 85% | 18% |
| Sunita A. | 85% | 85% | 98% | 75% | 20% |
| Betty E. | 92% | 72% | 95% | 92% | 15% |
| Adam C. | 85% | 78% | 99% | 90% | 8% |
| Clara M. | 90% | 90% | 95% | 85% | 22% |
| Char W. | 65% | 82% | 94% | 70% | 18% |
| Tal A. | 82% | 85% | 90% | 95% | 24% |
| Missy R. | 75% | 75% | 90% | 100% | 11% |
| Anisha P. | TBD | 90% | 92% | 82% | 22% |

*FIG. 14*

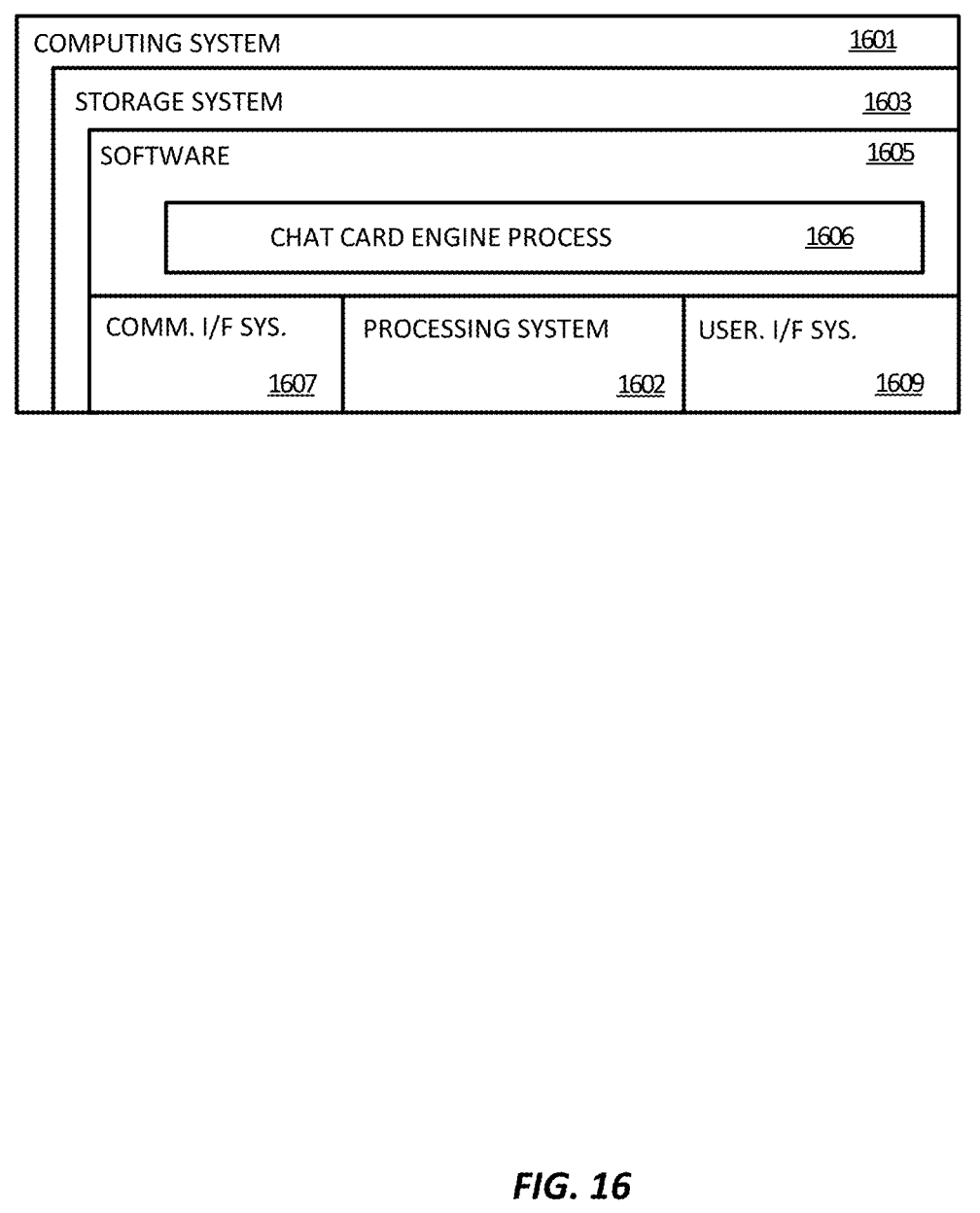

| COMPUTING SYSTEM | | 1601 |
| --- | --- | --- |
| STORAGE SYSTEM | | 1603 |
| SOFTWARE | | 1605 |
| CHAT CARD ENGINE PROCESS | 1606 | |
| COMM. I/F SYS. 1607 | PROCESSING SYSTEM 1602 | USER. I/F SYS. 1609 |

*FIG. 16*

CHAT CARD ENGINE(S) FOR CONVERSATIONAL CHAT CARDS

TECHNICAL FIELD

Aspects of the disclosure are related to the field of computer software applications and services and, in particular, to chat card engines for generating conversational chat cards which provide adaptive and enhanced learning exercises within educational environments.

BACKGROUND

Learning is a fundamental aspect of personal and academic growth, and its importance cannot be overstated. It is the process through which individuals acquire knowledge, skills, and understanding, providing the foundation for success in various facets of life. In this dynamic educational landscape, tools that facilitate effective learning become invaluable. Flashcards emerge as a powerful aid in this journey, offering a targeted and interactive approach to mastering new subjects. The concise format of flashcards encourages focused study, breaking down complex information into manageable snippets. Through repeated exposure to these bite-sized pieces of information, students engage in active recall, reinforcing their memory and understanding of key concepts. The process of creating and using flashcards not only enhances memorization but also promotes self-assessment, enabling students to identify areas that require further attention. In essence, flashcards serve as a versatile tool that aligns with the natural processes of human memory, making learning more efficient and enjoyable for students as they navigate the intricacies of various subjects.

Conventional flashcards, however, come with inherent limitations that hinder the development of a deeper understanding of the subject matter. One notable downfall is the lack of room for dialogue or the exploration of more profound questions. Flashcards typically present isolated pieces of information, focusing on rote memorization rather than encouraging critical thinking or interactive engagement. The one-sided nature of flashcards limits students' ability to delve into the nuances of a topic, inhibiting the development of a comprehensive understanding. Learning is not just about recalling facts; it involves the ability to connect information, analyze contexts, and ask probing questions. Conventional flashcards, with their succinct format, often fall short in fostering these essential aspects of learning.

Another significant downfall of conventional flashcards lies in their limited adaptability to individualized learning needs. Typically, the subject matter of flashcards tends to be standardized and generic, lacking the flexibility to cater to the unique requirements of individual classrooms or users. This lack of customization hinders the alignment of flashcard content with specific curriculum nuances or the diverse learning styles within a classroom. Educational content should ideally be tailored to resonate with the specific goals and preferences of students. Conventional flashcards, with their pre-determined content, often fall short in accommodating this need for personalization. In an era where personalized and adaptive learning approaches are gaining prominence, the static nature of traditional flashcards proves to be a constraint, limiting their effectiveness in addressing the diverse and dynamic educational landscape. As educators strive to create engaging and tailored learning experiences, exploring more flexible and customizable alternatives becomes crucial in overcoming this particular drawback associated with conventional flashcards.

As such, there is a need for a chat card engine, and its related functions, for providing enhanced and conversational chat cards that allow students to engage in a dialogue involving a given topic. That is, there is a need for more engaging learning approaches when it comes to learning new subject matter, such as providing a succinct platform, like the chat cards provided herein, which extend studying beyond rote memorization and short term recall; instead encouraging students to engage with the material and ask thought provoking questions.

SUMMARY

Technology disclosed herein includes software applications and services that provide a chat card engine, and its related functions, for generating conversational chat cards which provide adaptive and enhanced learning exercises within educational environments. In particular, an example chat card engine is provided herein to provide adaptive and conversational chat cards. As will be described in greater detail below, the chat cards provided herein tailor the flash card experience to an individual student's needs and provide a more engaging experience by allowing a student to participate in a conversation with the chat card engine.

To provide a chat card exercise including multiple chat cards, the chat card engine may determine a source document corresponding to the chat card exercise. For example, the student may select a desired chat card exercise to begin, and the chat card engine may identify the corresponding source document. The source document may be learning material that is provided to the chat card engine, for example, by the student or a reviewing user (e.g., an educator). In some cases, the chat card engine may analyze the source document to determine a topic and subtopics that fall under the topic. The chat card exercise may cover the topic, while each of the chat cards within the chat card exercise may be directed to a subtopic within the topic.

Once the source document is determined, the chat card engine may generate the chat cards to be included within the chat card exercise. As noted above, each of the chat cards may correspond to a subtopic present in the source document. For each of the chat cards, the chat card engine may generate a first prompt corresponding to a respective subtopic and provide the chat card including the first prompt to a client device, such as a client device corresponding to a student.

Responsive to receiving the chat card, the student may provide a first query to the chat card engine. As will be expanded on below, the first query may be a variety of different types of queries, such as an off-topic query, an example query, a hint query, or an exploratory query. Based on the type of query, the chat card engine 310 may generate a corresponding prompt. Additionally, the chat card engine 310 may determine an understanding score based on the received query. The understanding score may indicate whether or not the student understands the subtopic. Once an advancing understanding is determined, then the student may progress to the next chat card within the chat card exercise.

As will be evident by the below description, the chat card engine uses an adaptive and conversational environment to foster student engagement with the chat card exercise. When students are emotionally or intellectually engaged with learning material, they are more likely to invest cognitive effort needed for comprehension and retention of the subject material. As such, enhanced engagement with the subtopics of a chat card exercise aids in learning and retention of the learning material. By allowing the student to ask for hints, examples, and make exploratory requests (e.g., ask thought-provoking questions), the chat card engine enhances the student's investment in the chat card exercise, thereby improving the student's cognitive and emotional ties to the learning material.

From the educator's perspective, the chat card engine provides vital insight into the learning process for individual students, as well as a class as a whole, on the topics and subtopics covered by chat card exercises. The chat card engine evaluates how students perform on a chat card exercise, such as how accurately each of the chat cards were answered, and provides a summary to a respective educator. By providing educators with insights into how students are performing on exercises, the chat card engine allows educators to understand how material is received by students and what materials need to be revisited in future lessons. In other words, the chat card engine provides educators with information needed to tailor an overall class or curriculum to the needs of each individual classroom, thereby providing an enhanced learning environment.

This Summary is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 4 illustrates a process for providing the chat card engine and its related functions, according to an embodiment herein;

FIG. 14 provides a GUI illustrating metrics by student within a group across multiple chat card exercises, according to an embodiment herein;

FIG. 16 shows an example client device suitable for providing a chat card engine and related functions, according to an embodiment herein.

DETAILED DESCRIPTION

Figure 1:
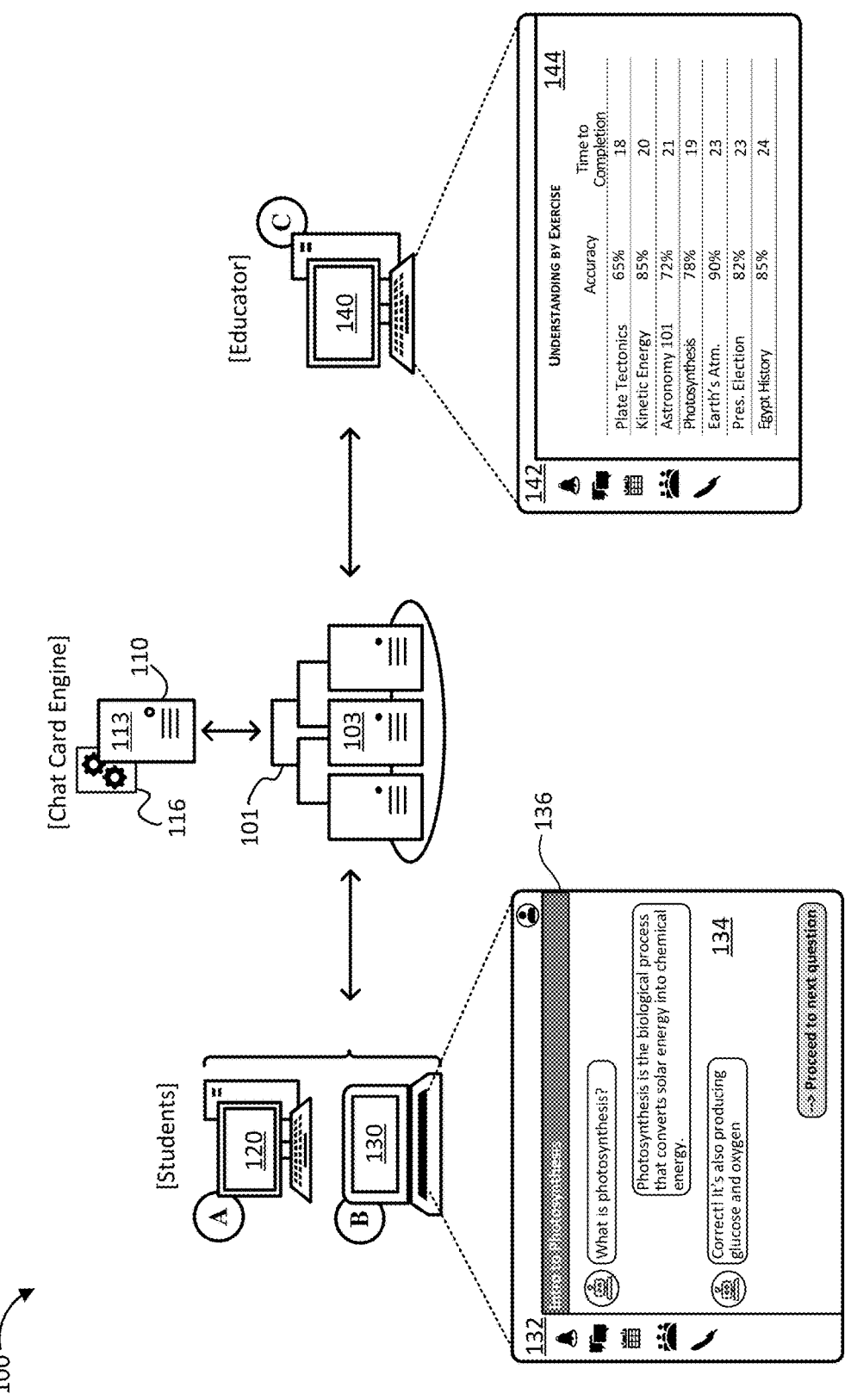
FIG. 1 illustrates an operational environment for providing a chat card engine for providing chat cards, according to an embodiment herein.

Flashcards have established themselves as a ubiquitous and widely embraced tool for learning new material. Their simplicity and effectiveness make them a common choice among students and educators alike. The format of flashcards, typically consisting of a concise question or prompt on one side and the corresponding answer on the other, facilitates quick and focused review. This streamlined approach promotes active recall, aiding in the reinforcement of key concepts and information. The portability of flashcards allows learners to study anytime, anywhere, making them a convenient companion for students with diverse schedules. Additionally, the repetitive nature of reviewing flashcards contributes to the consolidation of knowledge, enhancing long-term retention. Whether used for memorizing vocabulary, mastering mathematical formulas, or grasping historical facts, flashcards have proven to be a versatile and accessible means for learners to engage with and internalize new material effectively.

Despite their popularity, flashcards come with certain drawbacks that warrant careful consideration. One notable downfall is their inclination to promote surface-level learning, emphasizing rote memorization rather than cultivating a profound understanding of concepts. The concise format inherent in flashcards, with limited space for information, can inadvertently lead to a fragmented comprehension of complex topics. By simplifying information into isolated facts, flashcards may create a learning environment that prioritizes memorization over critical thinking and the exploration of interconnected ideas. While flashcards are effective for quick recall of specific details, the risk lies in students missing the broader context and connections within a subject.

Additionally, the static nature of flashcards poses another significant limitation by restricting their adaptability to the ever-evolving landscape of curricula and personalized educational needs. Educational approaches are dynamic, and curricula often undergo updates to align with the latest advancements and insights. In this context, the fixed content of flashcards may become outdated or fail to address emerging educational priorities. Moreover, the one-size-fits-all structure of conventional flashcards may not cater to the diverse learning preferences and individualized needs of students. A personalized learning journey requires flexibility and customization, allowing educators to tailor content to specific classroom dynamics and the unique learning styles of individual students or allowing students to focus on subject matter needed to advance his or her own learning journey. The static nature of flashcards may impede this adaptability, emphasizing the need for a more versatile and responsive approach to educational tools to ensure they remain effective and relevant in a rapidly changing educational landscape.

Moreover, the one-size-fits-all approach of conventional flashcards introduces yet another challenge, as it may not adequately cater to the diverse learning styles, individual preferences, and varying paces of students. Education is a deeply personal experience, and learners often engage more effectively when instructional methods align with their unique strengths and preferences. Additionally, students progress through material at different rates, with some mastering concepts swiftly while others benefit from a more gradual and deliberate pace. The rigid structure of traditional flashcards may limit their effectiveness in accommodating these varied learning styles and paces. Recognizing and embracing the diversity of how students absorb and process information, as well as respecting the individualized pace of learning, is essential for creating an inclusive and effective learning environment. As educators explore innovative teaching tools, it becomes imperative to consider alternatives that can be tailored to the individualized needs and pacing of students, fostering a more inclusive and engaging educational experience.

To address these and other shortcomings, an example chat card engine, and its related functions, is provided herein to provide conversational chat cards that allow students to actively engage with subtopics of a given subject matter until he or she understands the material. That is, the chat cards provided herein allow students to ask questions, request examples or hints, and write explanations of a subtopic instead of merely providing a one-dimensional answer to the question provided by the chat card. By following the general structure of a flashcard, the chat cards provide a succinct technique for engaging with a subtopic of material that is part of a broader subject matter. As such, a chat card allows a student to dive deeper into the subtopic of the chat card, asking thought provoking questions or requesting examples, until the student understands the material. As will be expanded on below, the chat card engine may determine that the student understands the subtopic based on queries received from the student. Once the chat card engine determines that the student understands the subtopic, a new chat card is generated for a subsequent subtopic and provided to the student.

As can be appreciated, by allowing students to interact with the chat cards, such as by asking questions or requesting examples, students can cultivate a deeper and more profound understanding of the underlying concepts. That is, the chat cards prompt active learning which enhances retention and cultivates critical thinking skills, empowering students to analyze, question, and apply knowledge in diverse contexts. Moreover, the chat cards encourage curiosity, which is a cornerstone of effective learning and provides motivation to extend a student's study session and topic range.

The chat card engine generates the chat cards based on a source document. The source document may be a course syllabus, outline, or class notebook provided by an educator, a book or textbook relating to a class, or material that a student provides to the chat engine because he or she wants to learn the underlying subject matter. Because the chat card engine generates the chat cards based off a provided source document, the chat cards can be individualized to a student's interest or tailored to the specific curriculum of a given class. As can be appreciated, this allows the chat cards to be dynamic and update as subject matter on a given topic advances or allows students to focus on a topic of interest.

Furthermore, the chat card engine provides educators with information on how students grasp various topics and materials. That is, the chat card engine can track how well each student performs on chat card exercises including subtopics and can provide a summary to the educator. Such a summary can provide the educator with vital information on how material is received by students and provide insight on what concepts and subtopics should be the focus of future lessons.

Overall, the chat card engine, and related functionality, provided herein not only improves the educational environment by providing enhanced chat card exercises that encourage students to actively participate in their learning experience, but it also provides educators with vital information required to adapt their teaching approach to the students' pace, knowledge, and specific challenges. The chat card engine helps build a deeper conceptual understanding of underlying subject matter, promotes critical thinking skills, and instills confidence in students as they navigate the intricacies of the subject. By fostering students' curiosity and knowledge of a diverse range of topics, the chat card engine aids students with gaining essential problem-solving and critical thinking skills that are applicable in various real-world scenarios. Overall, the conversational and engaging approach provided by the chat card engine and the subsequent acquisition of knowledge and skills contribute not only to academic and professional success but also to the development of practical, transferable skills crucial for lifelong learning and success.

Turning now to FIG. 1, FIG. 1 illustrates an operational environment 100 for providing a chat card engine for generating chat cards, according to an embodiment herein. As illustrated, the operational environment 100 includes an application service 101, a chat card engine 110, and client devices 120, 130 and 140. The application service 101 employs one or more server computers 103 co-located with respect to each other or distributed across one or more data centers. Example servers include web servers, application servers, virtual or physical servers, or any combination or variation thereof, of which computing system 1601 in FIG. 16 is broadly representative.

The client devices 120, 130, and 140 communicate with application service 101 via one or more internets and intranets, the Internet, wired and wireless networks, local area networks (LANs), wide area networks (WANs), or any other type of network or combination thereof. Examples of the client devices 120, 130, and 140 may include personal computers, tablet computers, mobile phones, gaming consoles, wearable devices, Internet of Things (IoT) devices, and any other suitable devices, of which computing system 1601 in FIG. 16 is also broadly representative.

Broadly speaking, the application service 101 provides software application services to end points, such as the client devices 120, 130, and 140, examples of which include productivity software for creating content (e.g., word processing, spreadsheets, and presentations), email software, and collaboration software. The client devices 120, 130, and 140 load and execute software applications locally that interface with services and resources provided by the application service 101. The applications may be natively installed and executed applications, web-based applications that execute in the context of a local browser application, mobile applications, streaming applications, or any other suitable type of application. Example services and resources provided by the application service 101 include front-end servers, application servers, content storage services, authorization and authentication services, and the like.

The application service 101 also includes an integration with the chat card engine 110, which is capable of generating chat cards based off a source document. As will be described in greater detail below, the chat card engine 110 generates chat cards based on a received source document and provides the chat cards to one or more of the client devices 120 and 130. The chat card engine 110 also interacts with the client devices 120 or 130 via the chat cards and may report on a student's progress. In other words, the chat card engine 110 may include one or more functions that allow the chat card engine 110 to receive a source document from a client device, generate chat cards from the source document, interact with a student on a given chat card, and generate a summary of a student's process on a chat card or a chat card exercise based on the student's interactions via the application service 101. In an example, the application service 101 may provide a chat card application through which the chat card engine 110 provides one or more of its functions.

To provide these functions, the chat card engine 110 employs one or more server computers 113 co-located with respect to each other or distributed across one or more data centers, of which computing system 1601 in FIG. 16 is broadly representative. In some embodiments, the chat card engine 110 hosts a content generator 116 on server computers 113 as well. In other embodiments, the content generator 116 may be hosted separately from the chat card engine 110, such as by a third party. As will be described in greater detail below, the chat card engine 110 interacts with a user via the content generator 116, such as a large language model (LLM).

The application service 101 hosts or provides an application, such as a chat card application, through which users of the client devices 120 and 130, user A and user B, respectively, can practice or challenge their knowledge of various topics through. For example, the application service 101 may provide or host an educational application through which exercises are prepared by an educator, such as the user of the client device 140 (user C). Users A and B may be students in the illustrated example. As such, users A and B may perform and complete one or more chat card exercises provided by the application service 101 via a corresponding chat card application. As used herein, a chat card exercise includes multiple chat cards directed to related subtopics that fall under the broader topic of the chat card exercise. In other words, a chat card exercise may be directed to a topic, such as photosynthesis, and include chat cards each directed to a subtopic of photosynthesis, such as chlorophyll or photosynthetic pigments.

To generate a chat card exercise, the chat card engine 110 may receive a source document from which the chat card exercise is generated. For example, the chat card engine 110, via the application service 101, may receive a source document, such as a class textbook, from the client device 140. In this scenario, user C may be an educator setting up chat card exercises for students within a class. In another scenario, user A may desire to practice his or her knowledge on a given topic and provide the chat card engine 110 with a source document containing information on that topic.

As can be appreciated, a source document may be any form of material that contains information on one or more topics. For example, the source document may be a lesson plan, syllabus, textbook, worksheet, educational handout, research paper, educational article or presentation, manual, study guide, book, or any other material containing subject matter on a topic. In some cases, the source document may be digitally transmitted, such as uploaded, to the chat card engine 110, while in other cases, a link to the source document may be provided to the chat card engine 110, from which the chat card engine 110 retrieves the source document or retrieves portions of the source document as needed. Various embodiments are described in greater detail below with respect to FIG. 3.

Once the source document is received, the chat card engine 110 may generate one or more chat cards for a chat card exercise. For example, upon receipt of the source document the chat card engine 110 may generate the chat cards; however, in another example, the chat card engine 110 may generate the chat cards once an indication to start the exercise is received from the client device 120 or 130. To generate the chat cards, the chat card engine 110 may identify one or more topics within the source document, and therefrom identify one or more subtopics for each topic. For example, if the source document is a textbook, the chat card engine 110 may identify each chapter in the textbook as a topic and then determine one or more subtopics within each chapter.

In another embodiment, instead of the chat card engine 110 determining the topic for a chat card exercise, an educator, such as user C, may identify the topic for a chat card exercise. Based on the identified topic, the chat card engine 110 may analyze the source document to determine subtopics within the identified topic. For each identified subtopic, the chat card engine 110 may generate a corresponding chat card. The group of the chat cards, each directed to a different subtopic under the broader topic, may be part of a chat card exercise.

Once generated by the chat card engine 110, a first chat card 134 that is part of a chat card exercise 136 is provided to user B via a user interface 132 of an application (e.g., chat card application) executing on the client device 130. As illustrated, the user interface 132 may provide the chat card exercise 136 including the generated chat card 134. User B can interact with the chat card 134 via the user interface 132. Once user B completes the chat card 134, such as by answering the prompt correctly, user B may be provided with a subsequent chat card within the chat card exercise until user B completes the chat card exercise 136. Generation and interaction with the chat card 134 and the chat card exercise 136 are described in greater detail below with respect to FIGS. 3-15.

Once user B completes the chat card exercise 136, the chat card engine 110 may generate a report of the interaction. As can be appreciated, while interacting with the chat card 134, user B may request hints, request examples, provide incorrect answers, ask thought provoking questions, request more information, or provide a correct answer to the chat card prompt. As such, the chat card engine 110 may monitor user B's interaction with the chat card 134 and provide a summary of the interactions with each chat card within the exercise 136. In some cases, the summary of the interactions, such as which chat cards within the exercise user B answered correctly or incorrectly, may be provided to the user B upon completion of the chat card exercise 136.

In other cases, the summary may be provided to user C, who may be an educator in this scenario. In such an example, the chat card engine 110 may generate a report or summary of the chat card exercise 136 for each student for whom user C supervises (e.g., each student within a class). User C may view the summary via a user interface 142 via an application executing on the client device 140. As illustrated, the user interface 142 may include a summary 144 of the exercise as completed by user B via the user interface 132. As will be described in greater detail below, the summary 144 may indicate how user B answered each of the chat cards within the chat card exercise 136.

Figure 2:
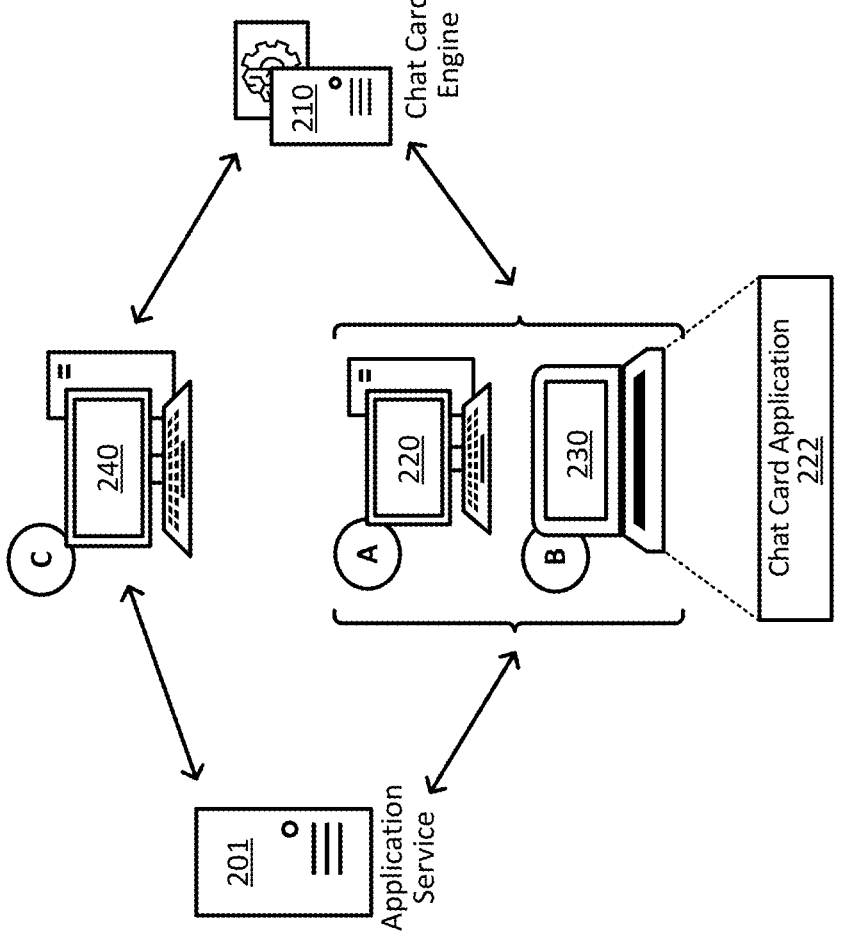
FIG. 2 illustrates a brief operational scenario to further highlight an application of the chat card engine, according to an embodiment provided herein.

Turning now to FIG. 2, FIG. 2 illustrates a brief operational scenario 200 to further highlight an application of the chat card engine, according to an embodiment provided herein. As shown, in operational scenario 200, there are two observed users (e.g., students), users A and B, and a reviewing user (e.g., educator), user C. Users A and B may operate the client devices 220 and 230, respectively, which may be the same or similar to the client devices 120 and 130 described above with respect to FIG. 1. Similarly, user C may operate the client device 240, which may be the same or similar to the client device 140.

Following the above example for user B, user B may open an application, such as a chat card application 222 (e.g., an education-based collaboration application), to begin a chat card exercise, such as the chat card exercise 136. To open the application 222, the client device 230 may communicate with an application service 201, which may be the same or similar to the application service 101. The application service 201 may initiate and operate the chat card application 222 on the client device 230. Once the application is open on the client device 230, user B may begin a chat card exercise within the chat card application 222 by, for example, selecting a topic for the exercise and interacting with the respectively generated chat cards within the exercise.

As noted above, the chat card application 222 provides enhanced and conversational chat card exercises as generated by chat card engine 210. The chat card engine 210 may be the same or similar to the chat card engine 110. As such, in some embodiments, upon initiating the chat card application 222 on the client device 230, software corresponding to the chat card engine 210 may also be initiated. That is, settings associated with the chat card application 222 may indicate a certain exercise is handled (e.g., generated and tracked) by the chat card engine 210. For example, if user C is an educator, user C may have prepared a chat card exercise to be completed in the chat card application 222. As part of the exercise, user C may have selected a setting to have the chat card engine 210 generate the chat cards within the exercise based on a source document provided by the user C for a student, here user B, to complete within a given time period. The user C may also select a setting to observe the completion of the exercise. As such, the chat card engine 110 generates the chat card exercise, including the chat cards within the chat card exercise, based on the source document provided by the user C, provides the chat card exercise to the user B, via the chat card application 222, and generates a summary of the user B's performance on the chat card exercise.

In another scenario, the user B may generate the chat card exercise. As such, as part of preparing the exercise, the user B may provide a source document to the chat card engine 210. The chat card engine 210 may generate the chat card exercise based on the source document provided by the user B and provide the chat cards within the exercise to the user B via the chat card application 222. Since the user B generated the chat card exercise, the settings may indicate that no summary should be generated and provided to the user C. Depending on the circumstances, however, the user B or user C may select a setting to provide a summary of a personal chat card exercise to a reviewing user, such as user C. It should be appreciated that while the description provided herein includes a reviewing user, such as user C (e.g., an educator), the chat card engine 210 and the related chat card exercises may be generated and used without a reviewing user. That is, user B may use the chat card engine 210 outside of a classroom setting and generate chat card exercises to expand his or her knowledge within a personal capacity.

As noted above, after a student (e.g., user B) completes and submits the chat card exercise via the chat card application 222, the chat card engine 210 may generate a report or summary of the chat card exercise. The report may indicate the subtopics that the student mastered and/or subtopics that require more attention within the chat card exercise. Additionally, the chat card engine 210 may generate a summary that provides metrics on user B's progress with respect to other students within a class. For example, the chat card engine 210 can generate a summary showing user B's accuracy on various topics in general or subtopics within a given exercise with respect to a class average or other students within his or her class. Reports and summaries generated by the chat card engine 210 are discussed in greater detail below, in particular, with respect to FIGS. 14-15.

Figure 3:
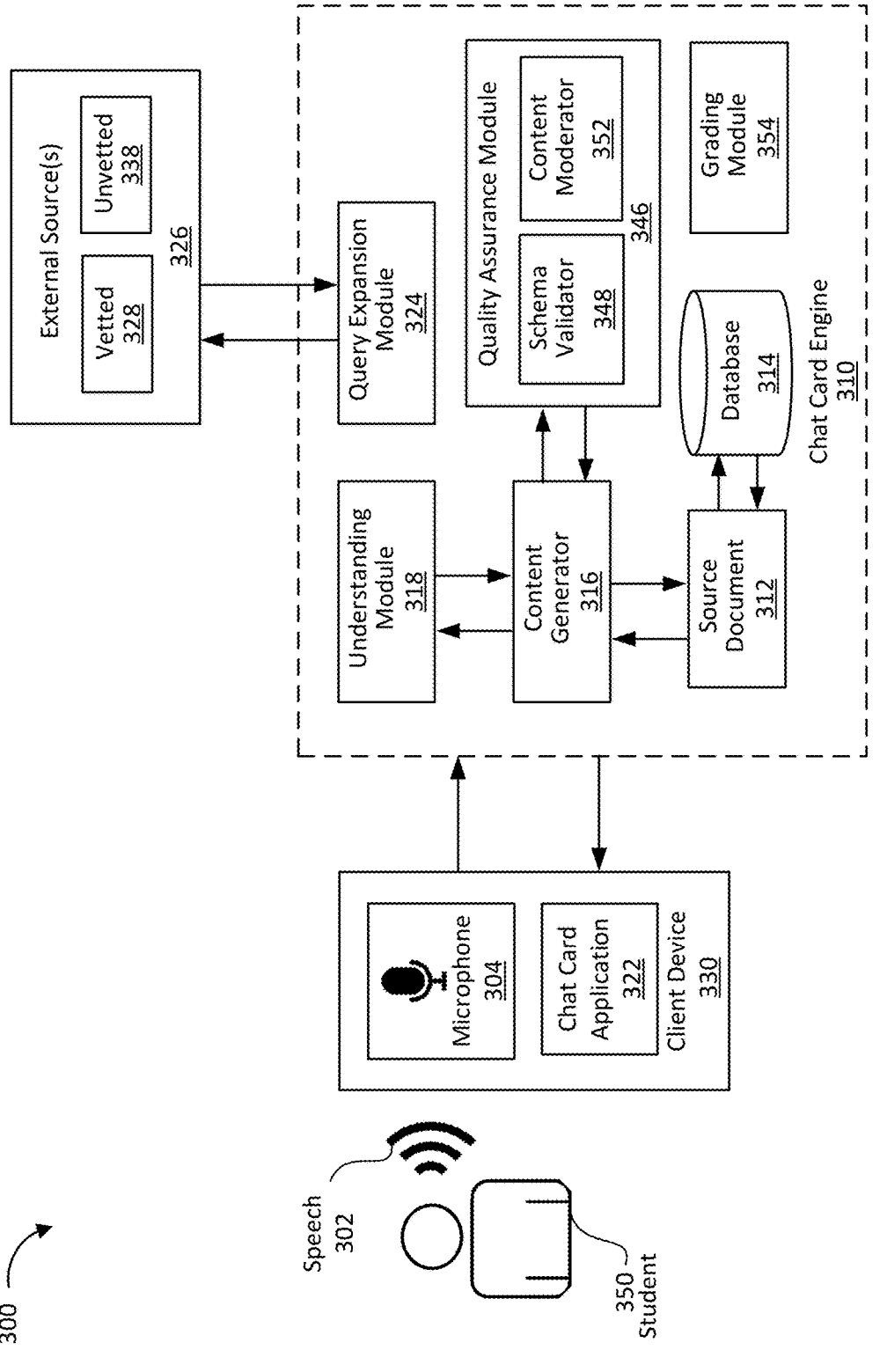
FIG. 3 illustrates a system for providing a chat card engine and related functions, according to an embodiment herein.

Turning now to FIG. 3, a system 300 for providing a chat card engine 310 is illustrated, according to an embodiment herein. The system 300 includes the chat card engine 310 and a client device 330, which may be the same or similar to the chat card engine 110 and the client device 130, respectively. The chat card engine 310 provides enhanced and conversational chat card exercises for a student 350 of the client device 330. For ease of discussion the user of the client device 330 is described as a student within an educational environment, however, it should be appreciated that other scenarios are also contemplated, such as the student 350 using the chat card engine 310 in a personal capacity.

For case of explanation, FIG. 3 is described in combination with FIG. 4. FIG. 4 illustrates a process 400 for providing the chat card engine 310 and its related functions, according to an embodiment herein. The process 400 may also be noted as the chat card engine process 400 herein. Although the process 400 is described with respect to components and elements of FIG. 3, it should be appreciated the one or more steps of the process 400 may be executed or applied to components or elements of any other Figure provided herein.

To begin, the student 350 corresponding to the client device 330 starts a chat card exercise. For example, the client device 330 provides an indication, such as opening a chat card application 322, to begin the chat card exercise. In some cases, the student 350, once within the chat card application 322, selects a chat card exercise to begin, as will be described in greater detail below with respect to FIG. 5. Once the student 350 selects a topic or opens the chat card application 322, the chat card engine 310 receives an indication to start a chat card exercise (405).

Responsive to receiving the indication to start a chat card exercise, the chat card engine 310 determines a source document 312 (410). That is, the chat card engine 310 determines a corresponding source document to the chat card exercise selected by the student 350. For example, if the student 350 selects to start a chat card exercise on Photosynthesis, then the chat card engine 310 may determine a source document 312 corresponding to the Photosynthesis chat card exercise. Following this example, the chat card engine 310 may determine that the source document 312 corresponding to the Photosynthesis chat card exercise relates to a textbook uploaded by an educator. In another example, the chat card engine 310 may determine that the source document 312 was uploaded by the student 350. As can be appreciated, the student 350 may provide the source document 312 to the chat card engine 310 to practice or learn a topic of interest.

As noted above, the source document 312 may be uploaded, linked, or otherwise provided to the chat card engine 310. As can be appreciated, in scenarios where an educator or reviewing user provides the source document 312 to generate a chat card exercise for more than one student, then the chat card engine 310 may store the source document 312 or otherwise retain the source document 312 for generation of chat card exercises. For example, the chat card engine 310 may store the source document 312 in a database 314. As the chat card engine 310 references the source document 312 to generate chat card exercises, the chat card engine 310 may call the source document 312 within the database 314.

Once the source document 312 is determined, the chat card engine 310 generates the chat cards based on the source document (415). That is, the chat card engine 310 generates the chat cards for a given chat card exercise. As described above, a chat card exercise includes multiple chat cards, and the chat card exercise may be directed to a topic with each of the chat cards being directed to a subtopic falling under the broader topic of the chat card exercise. That is, if the topic of the chat card exercise is Photosynthesis, then the chat cards within that exercise may be directed to chlorophyll and photosynthetic pigments.

In some cases, the chat card engine 310 generates all the chat cards within the chat card exercise at a single time, while in other cases the chat card engine 310 generates each chat card as the student 350 progresses through the chat card exercise. In some cases, a combination of these techniques may be used. As will be described in greater detail below, each chat card includes a prompt, such as a question for the student 350 to answer on a subtopic. The student 350 may then interact with the chat card engine 310 in a variety of ways to explore and answer the prompt. That said, the chat card engine 310 may generate an initial prompt for each of the chat cards within the chat card exercise at an initial time, while additional prompts and responses are generated by the chat card engine 310 during the student's 350 interaction with each respective chat card. If the chat cards for a chat card exercise are generated at an initial time, they may be stored within the database 314 for recall at a later time.

Regardless, the chat card engine 310 generates a first prompt based on a first subtopic (420). That is, the chat card engine 310 generates a first prompt based on a first subtopic within the broader topic of the chat card exercise. In some embodiments, the chat card engine 310 includes a content generator 316 and the content generator 316 generates the first prompt for the first chat card. For example, the chat card engine 310 may provide the first subtopic to the content generator 316 based on the source document 312 requesting a first prompt for the first chat card within the chat card exercise. The content generator 316 may be a text-to-text generative model, such as an LLM, or may be a text-to-image generative model or a multimodal (e.g., text and images) generative model. Examples include generative pre-trained transformer models. Although only one content generator 316 is illustrated, it should be appreciated that the chat card engine 310 may include more than one content generator 316, including different types of content generators 316. Additionally, while the content generator 316 is illustrated as part of the chat card engine 310, in some embodiments, the content generator 316 may be hosted separately from the chat card engine 310, for example, by a third party.

When requesting the content generator 316 to generate the first prompt for the first chat card, the chat card engine 310 may provide one or more parameters to the content generator 316. For example, parameters may include a task parameter that instructs the content generator 316 to act as an artificial intelligence (AI) tutor who is assisting a student in learning the information provided within the source document 312. Other parameters may include action parameters, such as informing the content generator 316 that it can provide a hint or example if requested by the student, and off-topic parameters which instruct the chat card engine 310 to politely redirect a student back to the topic if a query is determined to be off-topic (e.g., not related to the topic or subtopic of the chat card). In some cases, the parameters also include conversational parameters which provide the structure for the content generator's 316 response. For example, conversational parameters may include a limit of one question at a time as well as various other structural limitations. The conversational and action parameters are described in greater detail below.

Once the first prompt is generated, the chat card engine 310 generates a first chat card including the first prompt (425). The first chat card may also be generated by the content generator 316. An example of the first chat card and its components therein are described in greater detail below with respect to FIGS. 5-13.

Once generated, the chat card engine 310 provides the first chat card to the student 350. For example, the chat card engine 310 may transmit the first chat card such that it is displayed via the chat card application 322 on the client device 330 to the student 350. Upon receipt of the first chat card, the student 350 may provide a first query or response to the first prompt. As will be described in greater detail below, the student 350 may answer the first prompt, request an example, or ask for a hint. As can be appreciated, the student 350 may interact with the first chat card via the chat card application 322 in a variety of manners. For example, the student may use a mouse, keyboard, or digital stylus to respond to the first prompt with a first query. In another example, the student may use speech 302 to respond to the first prompt. As can be appreciated, the speech 302 may be captured by a microphone 304. The microphone 304 may be part of the client device 330 or may be separate from the client device 330 but operably coupled to the client device 330 such to provide the speech 302 from the student 350 to the chat card application 322.

Based on the student's 350 interaction with the first chat card, the chat card engine 310 receives the first query from the client device 350 (430). As noted above, the first query is made responsive to the first prompt and can include a variety of actions. For example, the first query may be a response to the first prompt, such as an answer to "what is photosynthesis," or the first query may be a request for a hint or an example. In some embodiments, the first query may be an off-topic query provided by the student 350. For example, in response to the first prompt, the student 350 may ask the chat card engine 310 to tell a joke. Following corresponding off-topic parameters, the chat card engine 310 may determine that the first query is off topic (e.g., not related to the topic, here photosynthesis) and provide a redirecting prompt which guides the student 350 back to the topic at hand. For example, the chat card engine 310 may generate a redirection prompt that responds to the off-topic query with a joke but then ask the student 350 to answer the first prompt.

Various examples of actions that could be included in a query provided by the student 350 responsive to a prompt are described with respect to FIGS. 5-13.

Responsive to receiving the first query, the chat card engine 310 determines an understanding score (435). For example, the chat card engine 310 may include an understanding module 318 and the understanding module 318 may determine the understanding score based on the first query. For example, the understanding module 318 may be or include a content generator, such as an LLM. In such an example, the chat card engine 310 may provide the first query to the understanding module 318 and ask the understanding module 318 to rank the query based on the first prompt. As part of this request, the understanding module 318 may be provided with a scoring guide, such as a ranking scale. For example, the chat card engine 310 may provide an understanding scale of 1 to 3, indicating that a 1 score indicates that the student 350 does not understand the subtopic, a 3 score indicates that the student 350 understands the subtopic, and a 2 score indicates that more information is needed to determine whether the student 350 understands the subtopic. In some cases, when an understanding score determines that the student 350 understands the subtopic, this may be referred to herein as an advancing understanding. As can be appreciated, various understanding scales may be used and the understanding module 318 may be prompted in a variety of manners to generate an understanding score based on the first query.

In some cases, an interaction history within a given chat card may be provided as part of the request for an understanding score to the understanding module 318. That is, if the student 350 and the chat card engine 310 have engaged in a conversation, having multiple prompts and queries exchanged within a given chat card, the understanding module 318 may be provided with that interaction history for determining an understanding score. The understanding module 318 may also be provided with the corresponding prompt, here the first prompt, when analyzing the query, here the first query, submitted by the student 350.

Depending on the student's 350 understanding score for the first query, the chat card engine 310 generates a second prompt. If the chat card engine 310 determines, based on the understanding score, that the student 350 understands the subtopic, then the second prompt may be a celebratory or congratulatory prompt indicating that the student 350 answered the first prompt correctly. However, if the chat card engine 310 determines, based on the understanding score, that the student 350 does not understand the subtopic or more information is needed to make the determination, then the second prompt may be a follow-up request prompting the student 350 to explore the subtopic further. That is, the chat card engine 310 generates a second prompt based on the understanding score for the previous prompt and query exchange, here the first prompt and first query (440). Once generated, the second prompt is provided to the student 350 via the chat card application 322 for response (445).

Depending on the query to which the second prompt was generated, the content within the second prompt may vary. That is, if the first query is a request for a hint, then the second prompt may include the requested hint. The content generator 316 may generate the hint (e.g., the second prompt) based on the first prompt, first query, and the subtopic of the chat card. In other words, the content generator 316 may be requested to generate a hint based on the first prompt, the first query, and the subtopic of the chat card. In some cases, the interaction history between the student 350 and the chat card engine 310 may also be considered. As can be appreciated, by providing the interaction history, the content generator 316 can tailor the hint based on previous hints, prompts, queries, and examples provided to the student 350.

As noted above, when generating a hint, the content generator 316 may be guided by hint parameters. Example hint parameters may include instructions such as "a hint should not tell the student the answer directly," "a hint is meant to trigger a cognitive process to assist the student in understanding the prompt," and "avoid hints that are too obvious or too general." In some cases, the hint parameters may also include an example of a hint to provide guidance to the content generator 316 during generation of the hint.

In some examples, instead of requesting a hint, the student may request an example or ask a question. As can be appreciated, the student may ask a variety of questions, such as requesting more information or requesting clarification (e.g., an exploratory query). For example, the student 350 may ask a thought-provoking question. Following the photosynthesis chat card example, the student 350 may ask the thought-provoking question of "could photosynthesis occur on other planets within the solar system?" As used herein, a thought-provoking question may be a question that stimulates critical thinking, challenges existing assumptions, or prompts deep reflection on a subtopic.

To respond to any query including a question or asking for an example, the chat card engine 310 may first determine whether a corresponding answer is within the source document 312. For example, the chat card engine 310 may parse the source document 312 based on the query to determine whether an answer is within the source document 312. If the chat card engine 310 determines that the source document 312 includes the answer, then the chat card engine 310, in particular the content generator 316, may generate a follow-up prompt including the answer to the query. When the answer is identified in the source document 312, the chat card engine 310 may generate a citation to where the answer was found within the source document 312. As can be appreciated, this may allow the student 350 to investigate the answer further by referencing the source document 312 using the citation.

In some cases, upon analyzing the source document 312 in view of the query, the chat card engine 310 may determine that the source document 312 does not include an answer to the query. For example, the chat card engine 310 may determine a query expansion requirement based on the source document 312 not containing an answer to the query. In particular, a query expansion module 324 may determine a query expansion requirement and then determine whether one or more external sources 326 includes an answer to the query. Examples of external sources 326 may include any material that is external to the source document 312, such as other textbooks or lesson plans stored within the database 314 that may correspond to the subtopic at hand. Following the photosynthesis example question, the chat card engine 310 may search for other source documents saved in the database 314 that may relate to photosynthesis or biology to answer the query. In other examples, however, the external sources 326 may include web-based sources, such as online scholarly articles, information based websites (e.g., Wikipedia), or online textbooks.

In some cases, there may be a hierarchy in which the query expansion module 324 searches for an answer to a query. For example, the chat card engine 310 may first analyze the source document 312 for the answer. If the chat card engine 310 is unable to determine the answer within the source document 312, the chat card engine 310 may direct the query expansion module 324 to search vetted external sources 328 for an answer. A vetted external source 328 may be an external source 326 that has been verified. A vetted external source 328 may be verified by a reviewing user, such as an educator, or may be determined by the chat card application 322 as a verified source, such as Wikipedia or scholar articles issued by the National Center for Biotechnology Information (NCBI). If an answer is determined within the vetted external source 328, the prompt generated based on the answer may include a note indicating that the information included in the prompt is from an external source. However, because the answer is from the vetted external source 328, the note may merely comment that the answer is from outside the learning material and from a verified external source. The prompt may also include a citation to the answer within the vetted external source 328.

In some cases, if the query expansion module 324 is unable to determine the answer within the source document 312 or within the vetted external source 328, then the query expansion module 324 may search for an answer within unvetted external sources 338. Unvetted external sources 338 may be external sources that are not verified. For example, if the educator identifies Wikipedia and articles from NCBI as vetted external sources 328, then if the query expansion module 324 searches outside of those sources, any other external source 326 may be determined to be an unvetted source 338. For example, if the query expansion module 324 searches for an answer to the above thought-provoking query on photosynthesis and finds a blog post about the possibility of life on other planets within the solar system, the blog post is considered an unvetted external source 338. In some cases, the unvetted external source 338 also includes any knowledge the chat card engine 310 identifies from within its model world knowledge. As those skilled in the art appreciate, the chat card engine 310, in particular the content generator 316, may be trained by feeding information into its model. That information forms the chat card engine's 310 model world knowledge.

When an answer is identified within an unvetted external source 338, any prompt generated based on that answer includes a caution tag. The caution tag may note that the answer is external to the learning material and the student 350 should exercise caution in relying on the information. In some cases, the prompt may also include a citation to the answer within the unvetted external source 338.

When the chat card engine 310 generates prompts, including the first prompt, the prompt may be provided to a quality assurance module 346. The quality assurance module 346 may perform a validation process on any prompts generated by the chat card engine 310. The validation process may include analyzing the prompts based on one or more quality parameters. For example, the quality assurance module 346 may include a schema validator 348 and a content moderator 352. The schema validator 348 may perform a schema validation process in which the schema validator 348 analyzes a prompt generated by the content generator 316 prior to the chat engine 310 providing the prompt to the student 350. In particular, the schema validator 348 may analyze the prompt based on one or more quality parameters, such as a length parameter, a coherency parameter, or pacing parameter. The length parameter may ensure that the prompt generator 316 is not beyond a sentence length, such as no prompt should be longer than 5 sentences. The coherency parameter may analyze the prompt to make sure all the content within the prompt is coherent. And the pacing parameter may analyze the prompt in view of the interaction history between the student 350 and the chat card engine 310 with the chat card to ensure that the prompt accurately matches the pace of the interaction. As can be appreciated, each student may vary in pacing when it comes to learning new material, and as such, the pacing parameter ensures that the prompt generated by the chat card engine 310 doesn't move the interaction too slow for the student 350 or push the student 350 too fast along in the learning process.

The content moderator 352 may perform a content moderation process in which the content moderator 354 analyzes the prompt based on the one or more quality parameters. In particular, the content moderator 352 may analyze the prompt based on a content quality parameter, which may provide guides on what content is considered inappropriate content. Accordingly, the content quality parameter may analyze the content of the prompt to ensure that the prompt does not include inappropriate content, such as content that may violate ethical standards, hate speech, or any content that promotes harm or illegal activities.

In some cases, the quality assurance module 346 may generate a quality score based on the evaluation of the quality parameters and prompts that fall below a quality score threshold may be resubmitted to the content generator 316 with a request to improve the quality of the prompt. In some cases, the request to regenerate the prompt may include the identified quality parameter that scored low within the quality score.

As the student 350 progresses and eventually completes a chat card exercise, the chat card engine 310 may evaluate the student's 350 accuracy for each of the chat cards within the exercise. For example, if the student 350 is unable to answer a chat card correctly and eventually moves on to the next chat card, the chat card engine 310 may determine that the student did not accurately answer that chat card. However, the student 350 may answer each of the remaining chat cards correctly. As such, the chat card engine 310 may grade or otherwise generate a summary of the student's interaction with the chat card exercise. For example, the chat card engine 310 may include a grading module 354 that grades the student's 350 completion of the chat card exercise. The grading module 354 may determine whether the student 350 completed the chat card exercise, completed the chat card exercise by an exercise due date, how the student 350 performed during the chat card exercise, and the like. Performance of the student 350 during a given chat card exercise may include a number of exchanges between the student 350 and the chat card engine 310 until a correct answer was provided, how long it took for the student to complete a chat card exercise (e.g., it took the student 10 minutes to complete the exercise), and the accuracy of the student 350 on each of the chat cards within the chat card exercise.

The grading module 354 may also generate a report or summary of the student's 350 grade for the chat card exercise. The report or summary generated by the chat card engine 310 may be provided to an educator or reviewer. Such an example is described in greater detail below with respect to FIGS. 14-15. As can be appreciated, by providing a summary of how the student interacted with the chat card exercise, the educator can evaluate what materials need to be covered in subsequent lessons and gather across all of the students within a given class where the class is with various topics and subtopics.

As noted above, in some cases the chat card engine 310 may generate and store chat card exercises within the database 314. As can be appreciated, computing resource requirements may be reduced by retrieving previously generated chat card exercises, hints, examples, and answers, instead of generating this content for each student for every exercise. For example, if all the students within a biology class perform the chat card exercise on photosynthesis, then the chat card engine 310 may generate this chat card exercise once and store it within the database 314. As each student within the class requests to start the exercise, the chat card engine 310 may retrieve the associated chat cards are provide them to the student. Similarly, answer, hints, and examples generated during an answer with one student may be stored and used if another student requests the same or similar information.

Once the student 350 provides a query containing a correct answer to the prompt, the chat card engine 310 may determine that the student understands the subtopic based on the understanding score. Responsive to determine that the student understands the subtopic, the chat card engine 310 may progress the chat card exercise to the next chat card. In other words, if the student 350 answers the prompt within the chat card correctly, then the chat card engine 310 generates or otherwise provides the next chat card within the exercise to the student via the chat card application 322.

Figure 5:
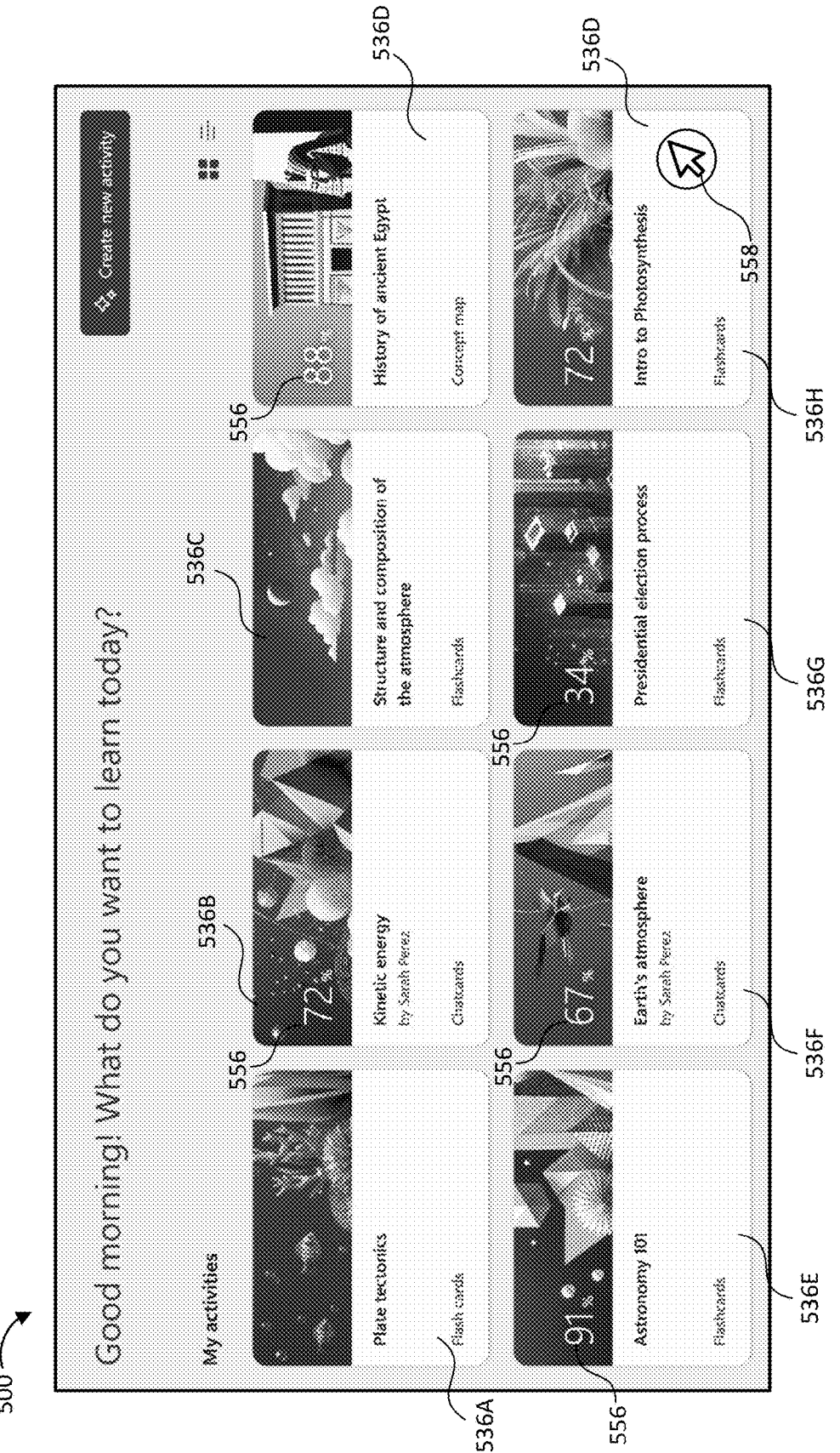
FIG. 5 illustrates an example chat card dashboard, according to an embodiment herein.

Turning now to FIG. 5, an example chat card dashboard 500 is provided, according to an embodiment herein. For ease of discussion, the remaining FIGS. 5-15 are described with reference to FIG. 3, however, it should be appreciated that other figures or components thereof may be equally applicable to the following discussion.

The chat card dashboard 500 may be provided to the student 350 via the chat card application 322. For example, the student 350 may open the chat card application 322 and be provided with the chat card dashboard 500. The chat card dashboard 500 includes a variety of chat card exercises 536A-H, each directed to a different topic. For example, the chat card exercise 536A is directed to Plate Tectonics, the chat card exercise 536B is directed to Kinetic Energy, the chat card exercise 536C is directed to Structure and Composition of the Atmosphere, the chat card exercise 536D is directed to History of Ancient Egypt, the chat card exercise 536E is directed to Astronomy 101, the chat card exercise 536F is directed to the Earth's Atmosphere, the chat card exercise 536G is directed to Presidential Election Process, and the chat card exercise 536G is directed to Intro to Photosynthesis. Since each of the chat card exercises are directed to a different topic, each chat card exercise may be generated by the chat card engine 310 based on a different source document 312. In some cases, however, more than one chat card exercise may be generated based on the same source document 312. For example, the chat card exercise 536C may be generated based on a first chapter within the source document 312, while the chat card exercise 536G may be generated based on a third chapter within the source document 312.

As illustrated, one or more of the chat card exercises 536A-H may include a grade indicator 556. The grade indicator 556 may indicate whether the student 350 completed the chat card exercise and with what accuracy the student 350 completed the corresponding chat card exercise. For example, the grade indicator 556 on the chat card exercise 536B indicates that the student 350 completed the chat card exercise 536B with a 72% accuracy, while the student 350 completed the chat card exercise 536E with a 91% accuracy. As can be appreciated, the grading module 354 of the chat card engine 310 may generate the grade for each of the grade indicators 556. If the chat card exercise does not include a grade indicator 556, such as the chat card exercise 536A or the chat card exercise 536H, this may indicate that the student 350 has not completed the chat card exercise yet. To begin or complete a chat card exercise, such as the chat card exercise 536H, the student 350 may select the chat card exercise 536H with a cursor 558.

Figure 6:
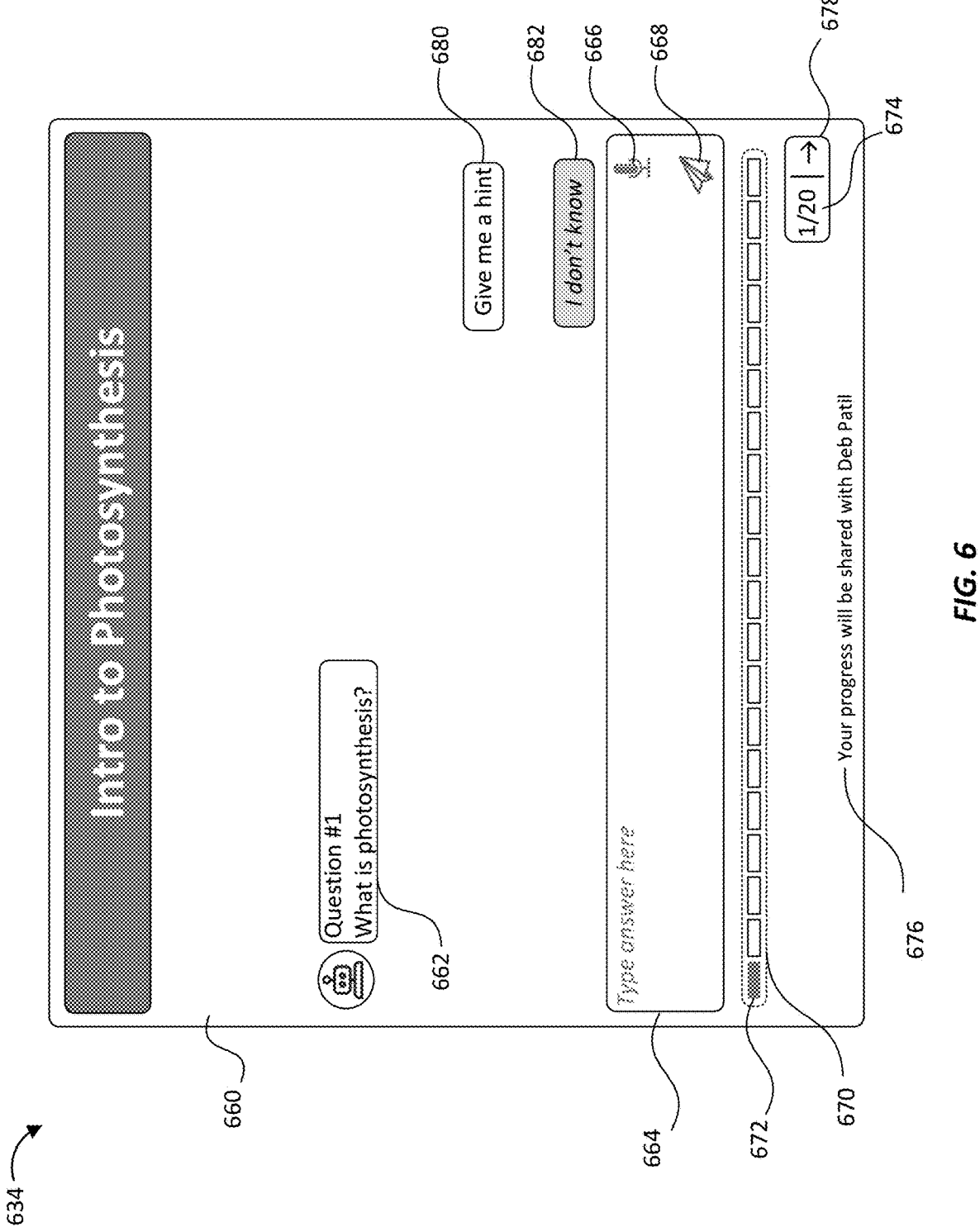
FIG. 6 illustrates an example chat card generated by a chat card engine, according to an embodiment herein.

Turning now to FIG. 6, an example chat card 634 generated by the chat card engine 310 is illustrated, according to an embodiment herein. The chat card 634 may be generated by the chat card engine 310 responsive to the student 350 selecting the chat card exercise 536H. As such, the chat card 634 may be directed to a subtopic within the topic of Intro to Photosynthesis. As shown, the chat card 634 may include a dialogue body 660 in which prompts and queries are exchanged between the student 350 and the chat card engine 310. For example, the dialogue body 660 includes a first prompt 662. The first prompt 662 includes the question "What is photosynthesis?"

To respond to the first prompt 662, the chat card 634 includes an input field 664 into which the student 350 may generate his or her response (e.g., query). As noted above, in some cases the student 350 may generate his or her response verbally. As such, the input field 664 may include a microphone option 666 for generating a response using speech 302. In other cases, the student 350 may generate the response within the input field 664 by typing, writing, or otherwise generating text within the input field 664. Once a response is generated within the input field 664, the student 350 may select the submit option 668. Upon submitting the response generated within the input field 664, the response may be provided within the dialogue body 660 as a query (not shown) from the student 350. Examples of a query generated within the dialogue body 660 are provided in the below examples.

The chat card 634 may also include a progress bar 670. The progress bar 670 may indicate how many chat cards the student 350 has completed within the chat card exercise 536H. For example, a first bar 672 is highlighted to indicate that the student 350 is on the first chat card 634 within the chat card exercise 536H. As will be illustrated below, the progress bar 670 may also indicate which of the chat cards within the chat card exercise 536H the student 350 completed correctly and which chat cards the student 350 incorrectly completed. In addition to or in place of the progress bar 670, the chat card 634 may also include a counter 674 that indicates which chat card the student 350 is on within the chat card exercise 536H.

The chat card 634 may also include a reviewer note 676 that indicates that that the student's 350 progress in the chat card exercise 536H is to be shared with a reviewing user, here Deb Patil. Once the student 350 completes the chat card 634 or if the student 350 wants to go to the next chat card without completing the chat card 634, the student 350 may select a next option 678.

Instead of generating a response to the first prompt 662 within the input field 664, the student 350 may select a hint request 680 or an "I don't know" option 682. In some cases, instead of selecting the hint request 680 or the "I don't know" option 682, the student 350 may type corresponding text into the input field 664 and the chat card engine 310 may generate a similar response.

Figure 7:
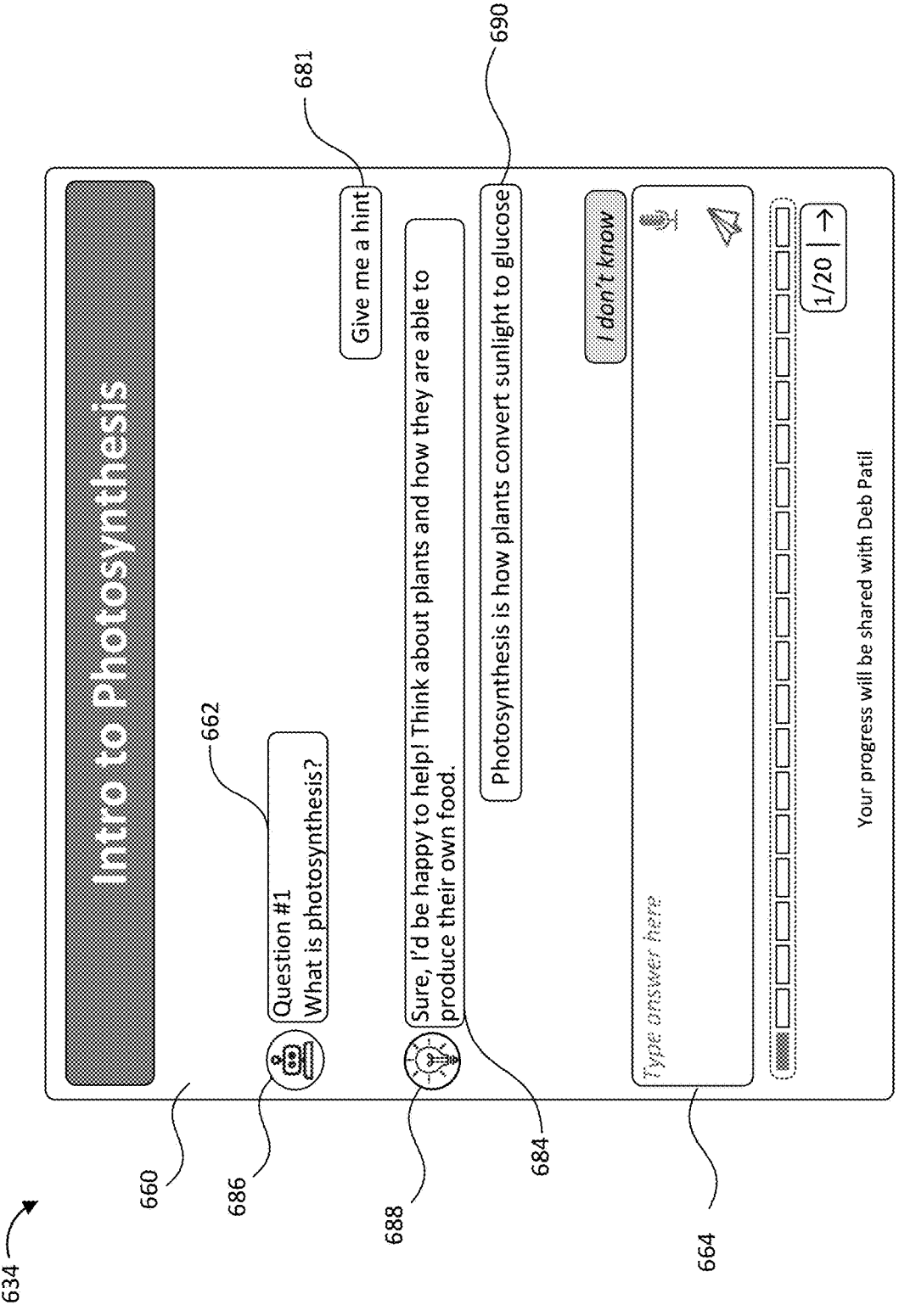
FIG. 7 illustrates an example hint prompt generated by a chat card engine, according to an embodiment herein.

Turning now to FIG. 7, an example hint prompt generated by the chat card engine within chat card 634 of FIG. 6 is illustrated, according to an embodiment herein. That is, the student 350 may select the hint request 680 in FIG. 6 and a hint prompt 684 may be generated within the dialogue body 660. As shown, responsive to selecting the hint request 680, a hint query 681 may be generated within the dialogue body 660. The hint query 681 may maintain its position within the dialogue body 660 as the student's 350 response to the first prompt 662. By maintaining the position of the hint query 681 within the dialogue body 660, a complete interaction history between the student 350 and the chat card engine 310 can be generated, showing how the student 350 responded to each prompt provided by the chat card engine 310.

In some embodiments, an icon may be provided next to content generated by the chat card engine 310 to indicate what type of response the provided prompt is. For example, an AI tutor icon 686 may be provided next to the first prompt 662 since the first prompt 662 corresponds to the question part of the chat card 634. For the hint prompt 684, a hint icon 688 may be provided to indicate that the hint prompt 684 was generated responsive to the hint request 680. As will be illustrated in the following Figures, the icon may vary depending on the type of prompt that is provided by the chat card engine 310.

As shown, responsive to receiving the hint prompt 684, the student 350 generated the query 690. In the illustrated example, the query 690 may include the correct answer to the first prompt 662. As described above, the chat card engine 310 may determine that the query 690 includes the correct answer by determining an understanding score for the query 690. As should be apparent, the chat card engine 310 may have determined that the understanding score for the hint query 681 indicates that the student 350 doesn't understand the subtopic or more interaction is needed to determine the student's 350 understanding level. As such, the chat card engine 310 may respond with the hint prompt 684 and wait for additional queries, such as the query 690, to determine whether the student 350 understands the subtopic.

Figure 8:
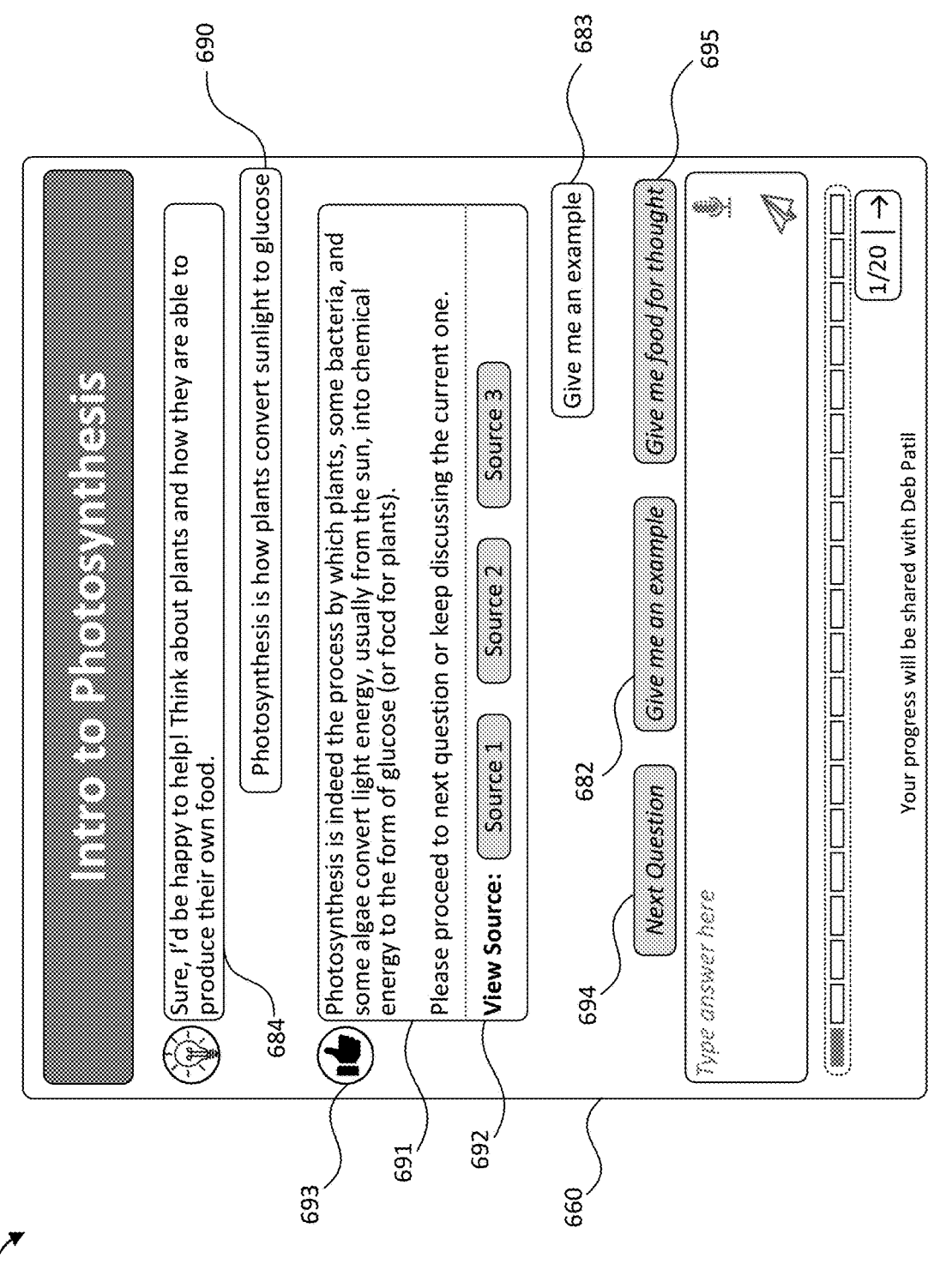
FIG. 8 illustrates an example correct answer prompt generated by a chat card engine, according to an embodiment herein.

Once the chat card engine 310 determines that the student 350 understands the subtopic (e.g., an advancing understanding is determined), based the corresponding understanding score for the query 690, the chat card engine 310 may generate an indication that the student 350 provided the correct answer. Referring now to FIG. 8, an example correct answer prompt 691 is illustrated, according to an embodiment. As shown, the correct answer prompt 691 is generated based on the student's 350 query 690 that includes the correct response. The correct answer prompt 691 may include a celebratory message, such as "Absolutely right!," to indicate that the student 350 answered correctly. In some cases, the correct answer prompt 691 may provide additional information on the correct answer, such as expanding on the query 690. For the additional information included in the correct answer prompt 691, the correct answer prompt 691 may also include a citation 692. As noted above, when generating content for a prompt, the chat card engine 310 may include a citation to corresponding material in the source document 312 or the vetted external source 338.

To indicate that the correct answer prompt 691 indicates a correct answer, a correct answer icon 693 may be provided proximate to the correct answer prompt 691 within the dialogue body 660. Similar to the other icons described above, the correct answer icon 693 may provide a visual indication within the interaction answer of the chat card 634 of what type of prompts the chat card engine 310 provided. Following receiving the correct answer prompt 691, the student 350 may continue to the next chat card via an option 694, request an example via the option 682, or request additional information via an option 695. As illustrated, the student 350 selects the example option 682 and an example query 683 is generated within the dialogue body 660.

Figure 9:
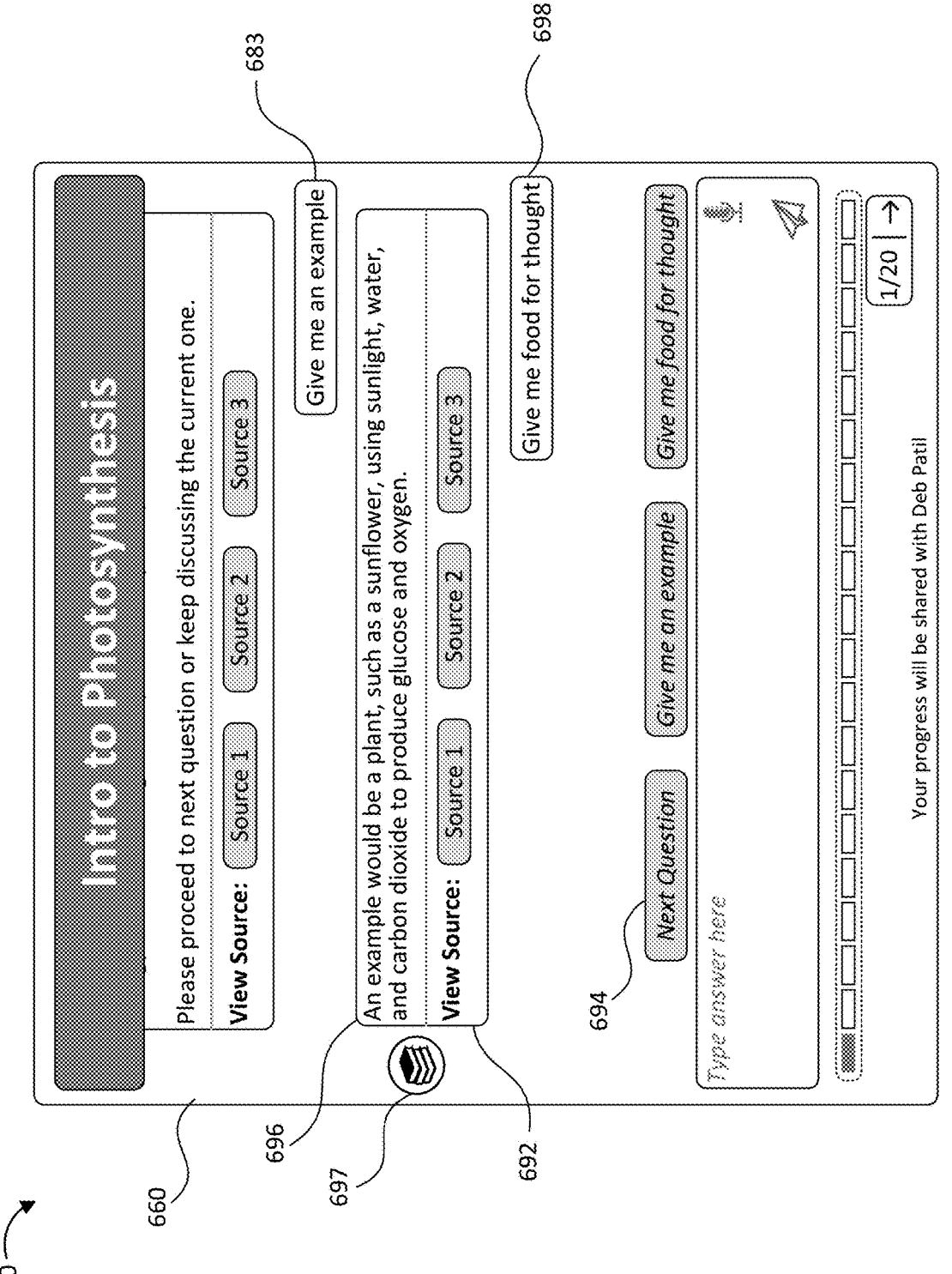
FIG. 9 illustrates an example prompt generated by a chat card engine, according to an embodiment herein.

Turning now to FIG. 9, an example prompt 696 generated by the chat card engine 310 is illustrated, according to an embodiment herein. That is, the example prompt 696 may be generated responsive to the student 350 generating the example query 683 by selection of the example option 682. Responsive to receiving the example query 683, the chat card engine 310 may generate the example prompt 696. For example, the chat card engine 310 may request the content generator 316 to generate an example of photosynthesis based on the interaction history between the student 350 and the chat card engine 310 within the dialogue body 660. As such, the content generator 316 may analyze all the interactions within the dialogue body 660 and generate the example prompt 696. Since the example prompt 696 is a different type of prompt, the example prompt 696 may include an example icon 697. Additionally, the example prompt 696 may include a citation 692 to where material corresponding to the example can be found either in the source document 312 or the vetted external sources 328.

Upon reviewing the example prompt 696, the student 350 may want to explore photosynthesis further. As such, the student 350 may select option 695 or otherwise generate a query 696 requesting "food for thought." The query 696 may be an exploratory query that indicates that the student 350 wants more information on the subtopic or wants to explore the subtopic further.

Figure 10:
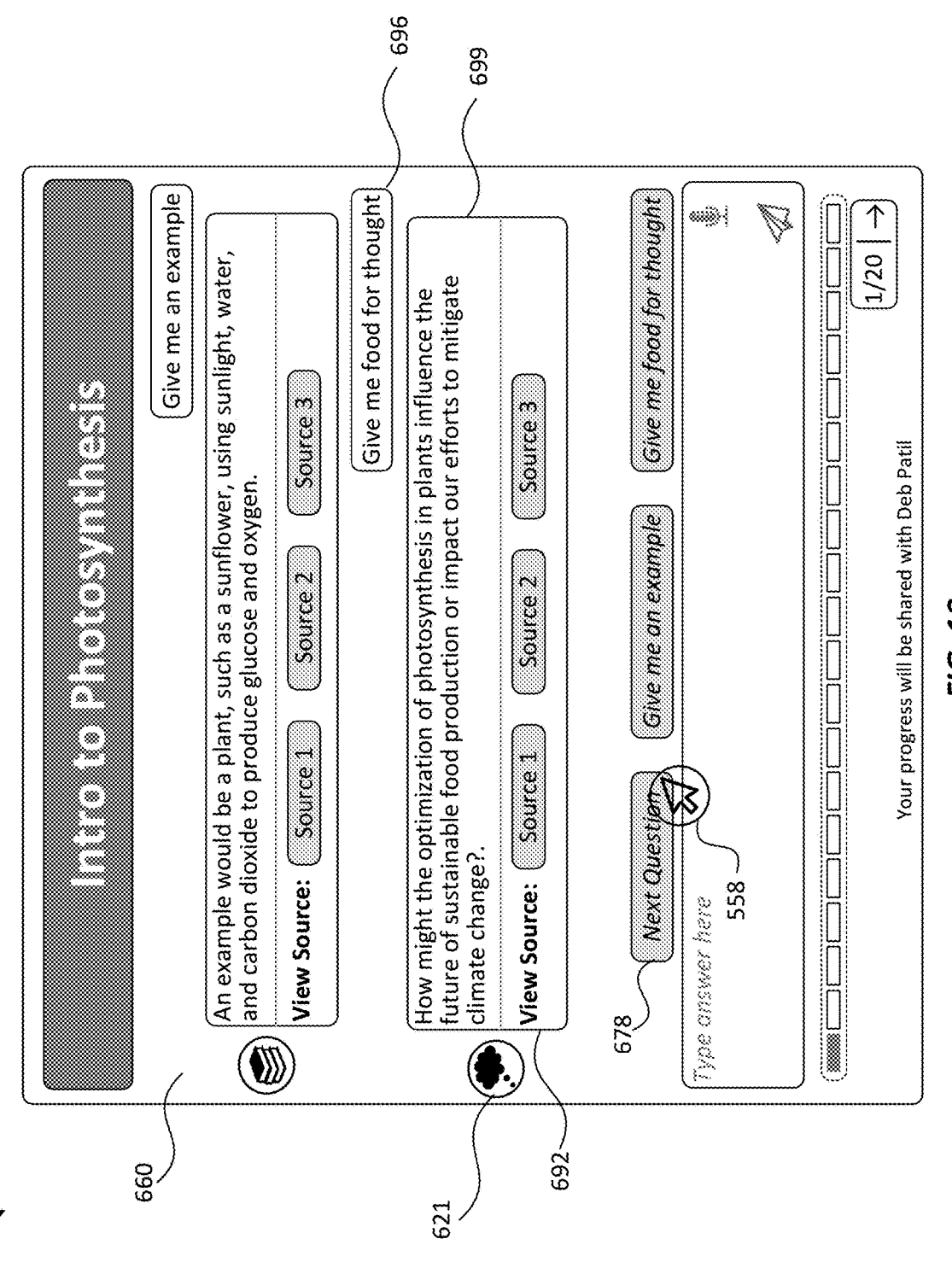
FIG. 10 illustrates an example exploratory prompt generated by a chat card engine, according to an embodiment herein.

Turning now to FIG. 10, an example exploratory prompt 699 generated by the chat card engine is illustrated, according to an embodiment herein. The exploratory prompt 699 may be generated responsive to the chat card engine 310 receiving the query 696 from the student 350 requesting additional information on the topic. As illustrated, the exploratory prompt 699 may be in the form of a question meant to provoke the student 350 to think further on the subtopic. The exploratory prompt 699 includes an exploratory icon 621 and a citation 692 to where the corresponding material can be found.

In the illustrated example, upon review of the exploratory prompt 699, the student 350 may determine that its time to proceed to the next chat card. Since the chat card engine 310 determined that the student 350 understands the subtopic, as indicated by the advancing understanding score determined for the query 690, the chat card engine 310 may enable the student 350 to progress to the next chat card. In some cases, the student 350 can proceed to the next chat card without providing a correct answer indicating that he or she understands the subtopic, however, the chat card engine 310 may identify that chat card as an incorrect answer within the chat card exercise 536H. To proceed to the next chat card, the student 350 may select the next option 678 with the cursor 558.

Figure 11:
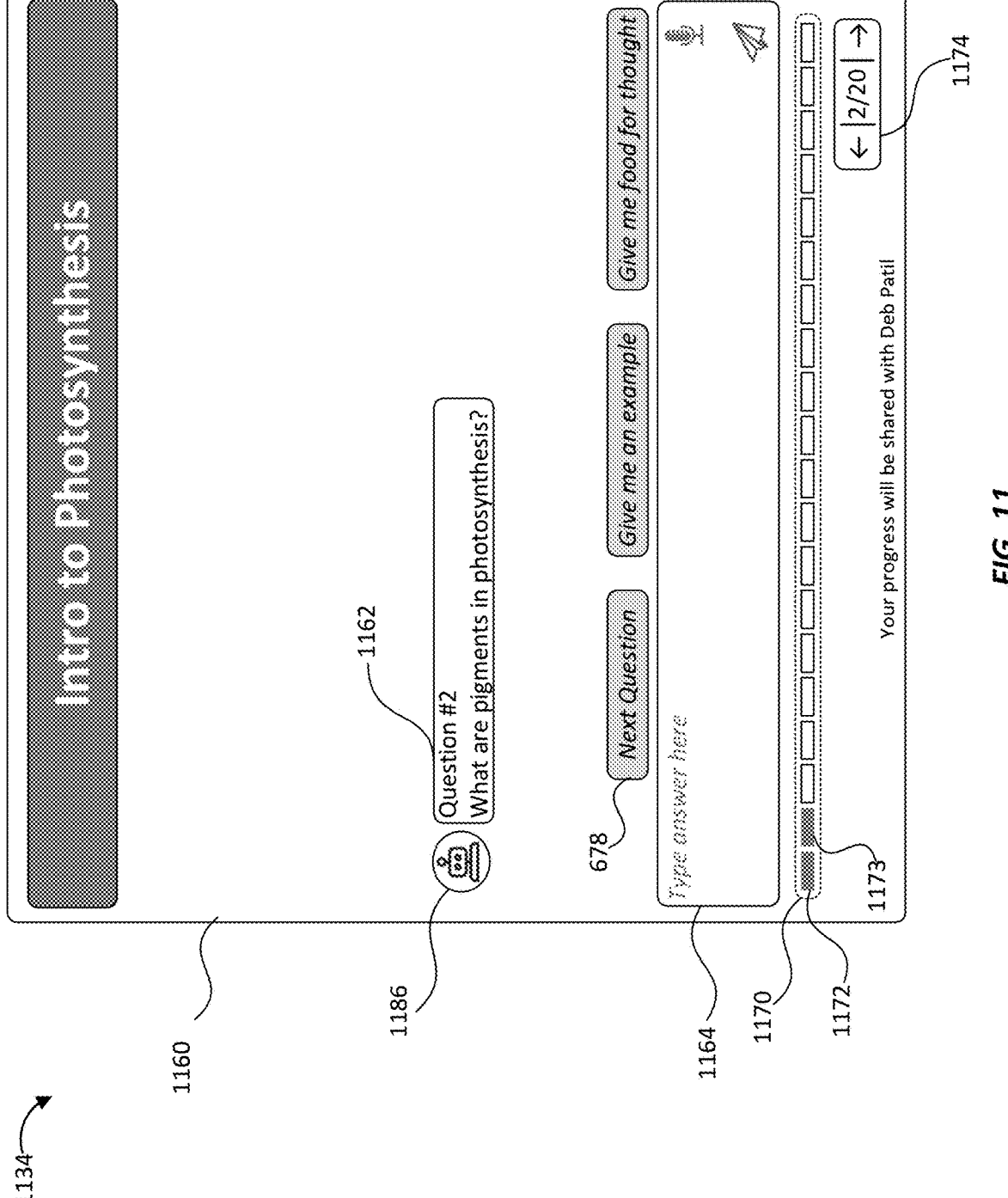
FIG. 11 illustrates an example second chat card generated by the chat card engine, according to an embodiment herein.

Turning now to FIG. 11, an example second chat card 1134 generated by the chat card engine 310 is illustrated, according to an embodiment herein. The second chat card 1134 may be generated responsive to the student 350 selecting the next option 678 on the chat card 634. The second chat card 1134 may be the same as the chat card 634 except that it is directed to a different subtopic. For example, the second chat card 1134 includes a prompt 1162 asking about photosynthesis pigments, which is the subtopic of the second chat card 1134, while the first prompt 662 of the chat card 634 asked generally about photosynthesis, which is the subtopic for the chat card 634. Similar to the chat card 634, the second chat card 1134 includes a dialogue body 1160 for displaying the interaction history between the student 350 and the chat card engine 310 within the second chat card 1134.

The second chat card 1134 also includes an input field 1164 and a progress bar 1170. As illustrated, since the second chat card 1134 is the second chat card within the chat card exercise 536H, the progress bar 1170 includes a first bar 1172 and a second bar 1173 highlighted or otherwise visibly different from the remaining bars on the progress bar 1170 to indicate the student 350's progress. The second chat card 1134 also includes a counter 1174, indicating that the student 350 is on the second chat card 1134. As can be appreciated, the student 350 may interact with the second chat card 1134 until an understanding score is achieved indicating that the student 350 understands the subtopic. At this time, the student 350 may process to the next chat card within the chat card exercise 536H. As noted above, the student 350 may also proceed to the next chat card without answering the chat card 1134 correctly, however, in such a case the chat card engine 310 may determine that the student 350 has incorrectly answered the chat card. In other words, if the chat card engine 310 does not determine an understanding score indicating that the student 350 understands the subtopic of the second chat card 1134 but the student 350 progresses to the next chat card anyways, the chat card engine 310 may mark the second chat card 1134 as incorrectly answered.

Figure 12:
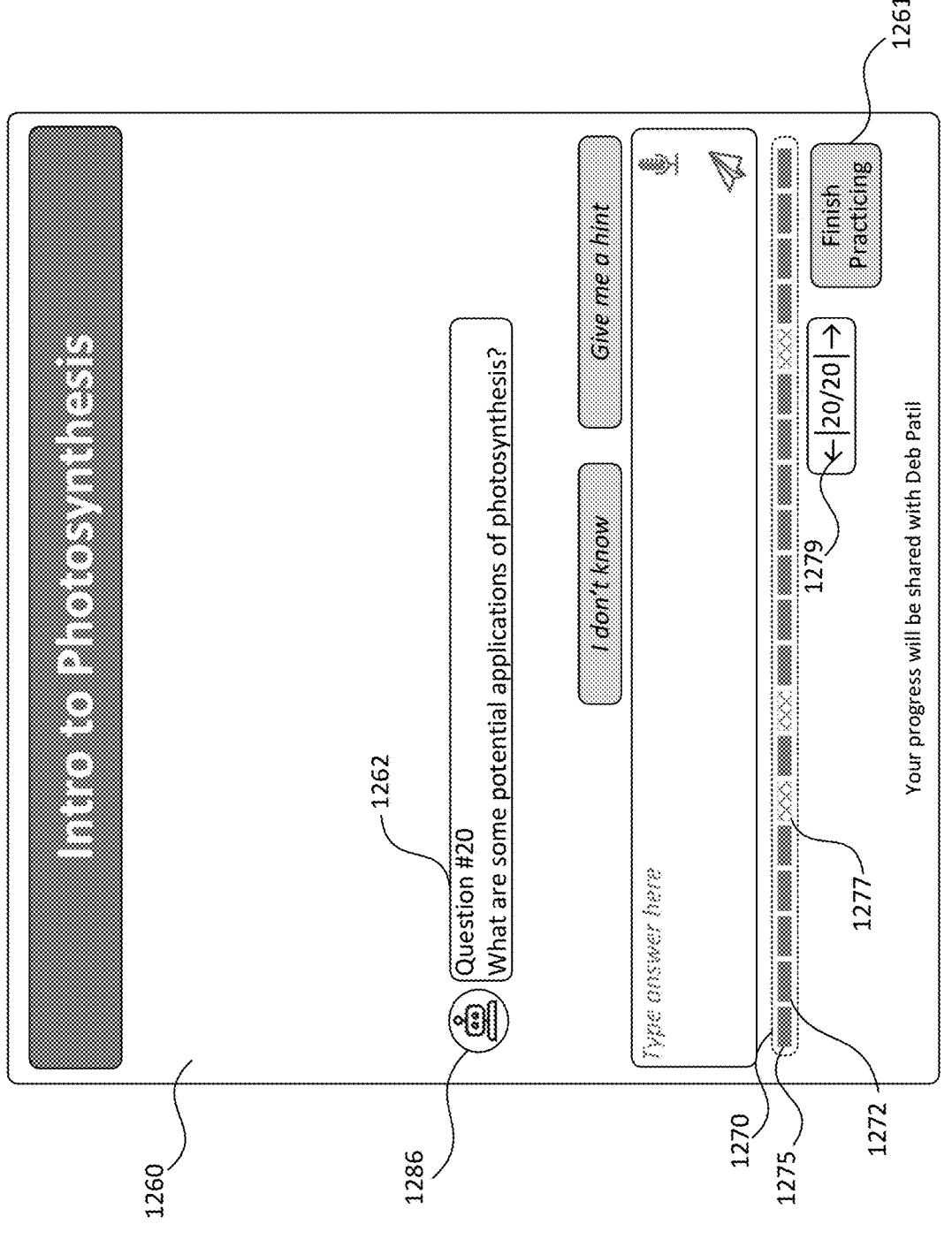
FIG. 12 illustrates an example final chat card within a chat card exercise, according to an embodiment herein.

Turning now to FIG. 12, an example final chat card 1234 within a chat card exercise is illustrated, according to an embodiment herein. The final chat card 1234 may be the same or similar to the chat cards 634 or 1134, except it is directed to a different subtopic. As indicated by a prompt 1262, the chat card 1234 is directed to the subtopic of "potential applications of photosynthesis." The student 350 may interact with the final chat card 1234 as described above until an understanding score indicating the student 350 understands the subtopic is determined by the chat card engine 310. In other words, the student 350 may interact with the final chat card 1234 until he or she completes the final chat card 1234.

As illustrated, the final chat card 1234 includes a progress bar 1270. Since the student 350 has completed all of the chat cards within the chat card exercise 536H, each of the bars 1272 within the progress bar 1270 are visually changed to indicate completion. In some cases, each of the bars 1272 are visually modified to indicate whether the student 350 completed the corresponding chat card correctly or incorrectly. For example, the bar 1275 may be a first color, indicating that the student 350 answered the corresponding chat card correctly, while the bar 1277 may be a second color to indicate that the student 350 answered the corresponding chat card incorrectly. Accordingly, the illustrated progress bar 1270 may indicate that the student 350 answered 17 of the chat cards correctly, while answering 3 of the chat cards incorrectly.

When the student 350 completes the chat card 1234, the student 350 may select a finish option 1261. Upon selection of the finish option 1261, the chat card exercise 536H may be marked as completed and the chat card engine 310 may generate a grade, for example by the grading module 354, for the chat card exercise 536H. If the student 350 wants to revisit any of the chat cards within the chat card exercise 536H, the student 350 may select a back option 1279 to navigate to the desired chat card. In some cases, even once the chat card exercise 536H is completed, the student 350 may be able to navigate to already completed or skilled chat cards to revisit the material.

Figure 13:
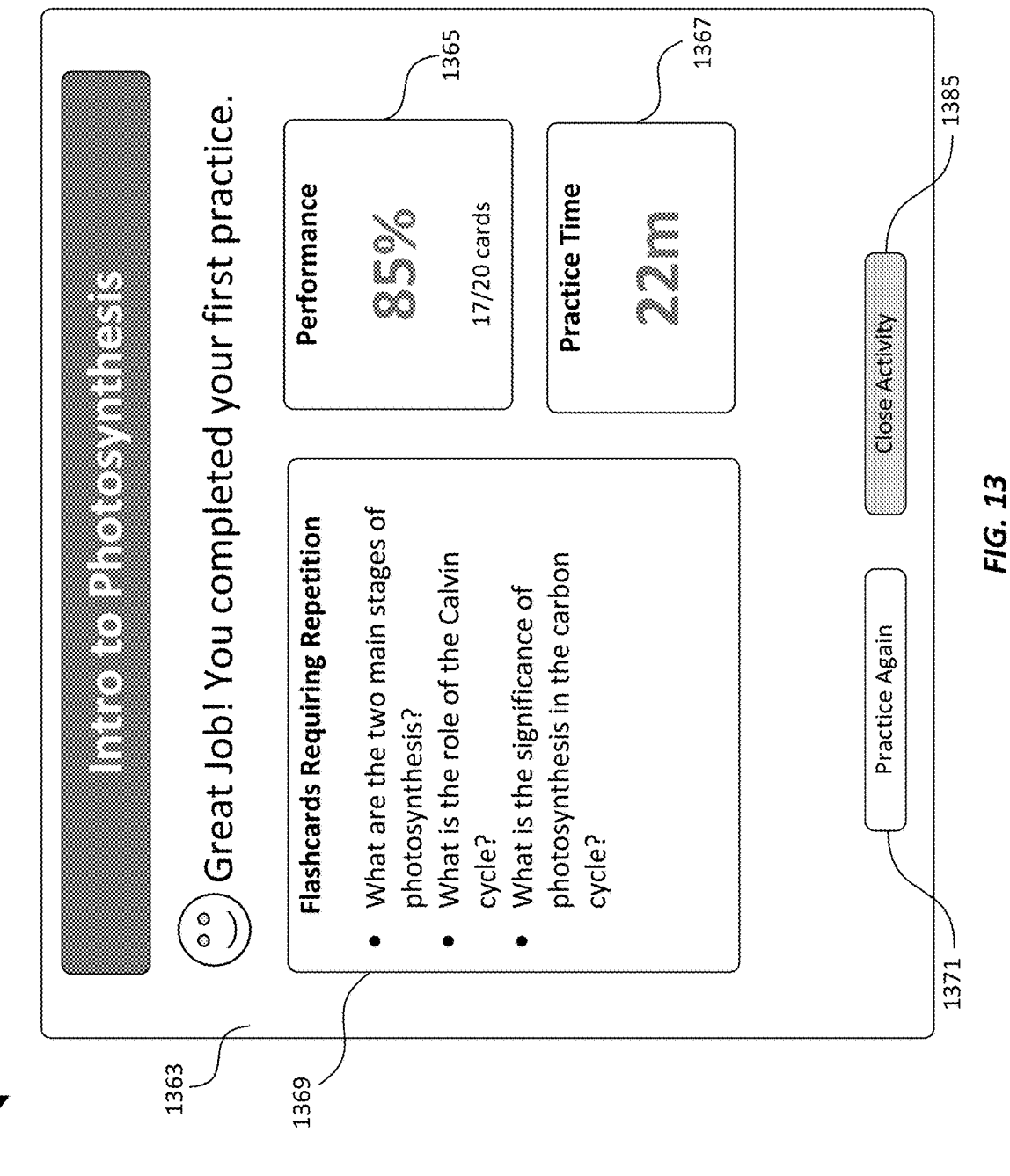
FIG. 13 illustrates a graphical user interface (GUI) for providing a completion card for a chat card exercise, according to an embodiment herein.

Turning now to FIG. 13, a graphical user interface (GUI) 1300 providing a completion card 1363 for the chat card exercise 536H is illustrated, according to an embodiment herein. As shown, the completion card 1363 includes an accuracy panel 1365, a practice time panel 1367, and a revisit panel 1369. The accuracy panel 1365 may include a grade or otherwise include the accuracy at which the student

350 answered the chat cards within the chat card exercise 536H. The practice time panel 1367 may include the time it took the student 350 to complete the chat card exercise 536H, such as from start to finish. And the revisit panel 1369 may highlight subtopics or chat cards that the student 350 may wish to revisit. That is, the revisit panel 1369 may include the prompts from the chat cards that the student 350 answered incorrectly or that the interaction history indicated that the student 350 did not fully understand the subtopic. For example, the understanding score for one of the chat cards may have needed more information to determine whether the student 350 understood the subtopic but the student 350 selected to proceed to the next chat card without answering the prompt correctly.

The completion card 1363 may include an option 1371 to restart or revisit the chat card exercise 536H. Upon selecting the option 1371, the chat card exercise 536H may restart. If the student 350 is done with the chat card exercise 536H, then the student 350 may select option 1385 to complete and close the chat card exercise 536H.

Beginning with FIG. 14, FIG. 14 illustrates a GUI 1400 for providing metrics by student within a group across multiple chat card exercises, according to an embodiment herein. Specifically, the GUI 1400 illustrates a user interface 1442 that a reviewing user, such as an educator, may interact with. For example, the GUI 1400 may illustrate an example user interface 142, as referenced in FIG. 1, provided to user C via the client device 140.

The user interface 1442 includes components associated with a chat card application (e.g., the chat card application 222 in FIG. 2), including components 1451, 1453, 1455, and 1457. The component 1451 is representative of a main title bar that allows a reviewing user to, among other functions, open, close, minimize, or maximize user interface 1442. The component 1451 includes a search box 1453 via which a user may input search queries with respect to content in the chat card application such as exercises, class lists, and class materials.

The component 1455 is representative of a feature bar that includes various icons for accessing modules of the application. For instance, the component 1455 includes an activity icon for checking alerts or reminders, a chat icon for chatting with other users, an icon for accessing team-oriented flows, an exercises icon for posting and reviewing exercises, a calendar icon for accessing a calendar feature, a call icon for placing voice calls, a files icon for managing files, and a store icon for accessing an app store. In some implementations, the component 1455 may include an icon for accessing a chat card engine, a chat card engine add-in application, or the like.

The app store—accessing via the store icon—provides the user with the ability to download and install "add-in" applications that are integrated into the context of the main application. Here, it is assumed for exemplary purposes that the user has installed a chat card engine through the store (or by another mechanism) or that the chat card application includes the chat card engine otherwise installed therein. As illustrated in FIG. 14, the chat card engine can be loaded and executed in the context of another application, such as the chat card application 222 described with respect to FIG. 2.

In the illustrated example, an educator may navigate to an exercise summary 1443. The exercise summary 1443 may include a report 1445 for chat card exercises completed by students within a given group, such as a class. The report 1445 may be generated by a chat card engine, such as the chat card engine 110 or 310. As illustrated, the report 1445 may provide an accuracy metric for each student within the group. As can be appreciated, the report 1445 may provide vital information to the educator on how well the students within a class are progressing or what needs to be revisited to aid the students with their learning process.

In an example embodiment, the educator may select a respective exercise, such as "Plate Tectonics" and be provided with metrics on how the class performed for each chat card within the Plate Tectonics exercise. In some cases, a class average for each chat card may be provided, while in other cases, metrics for how each student within the class performed on each chat card is provided. As can be appreciated, by providing the educator with the metrics for each chat card within a given exercise, the educator can better appreciate which questions or areas of the subject matter require further instruction.

Figure 15:
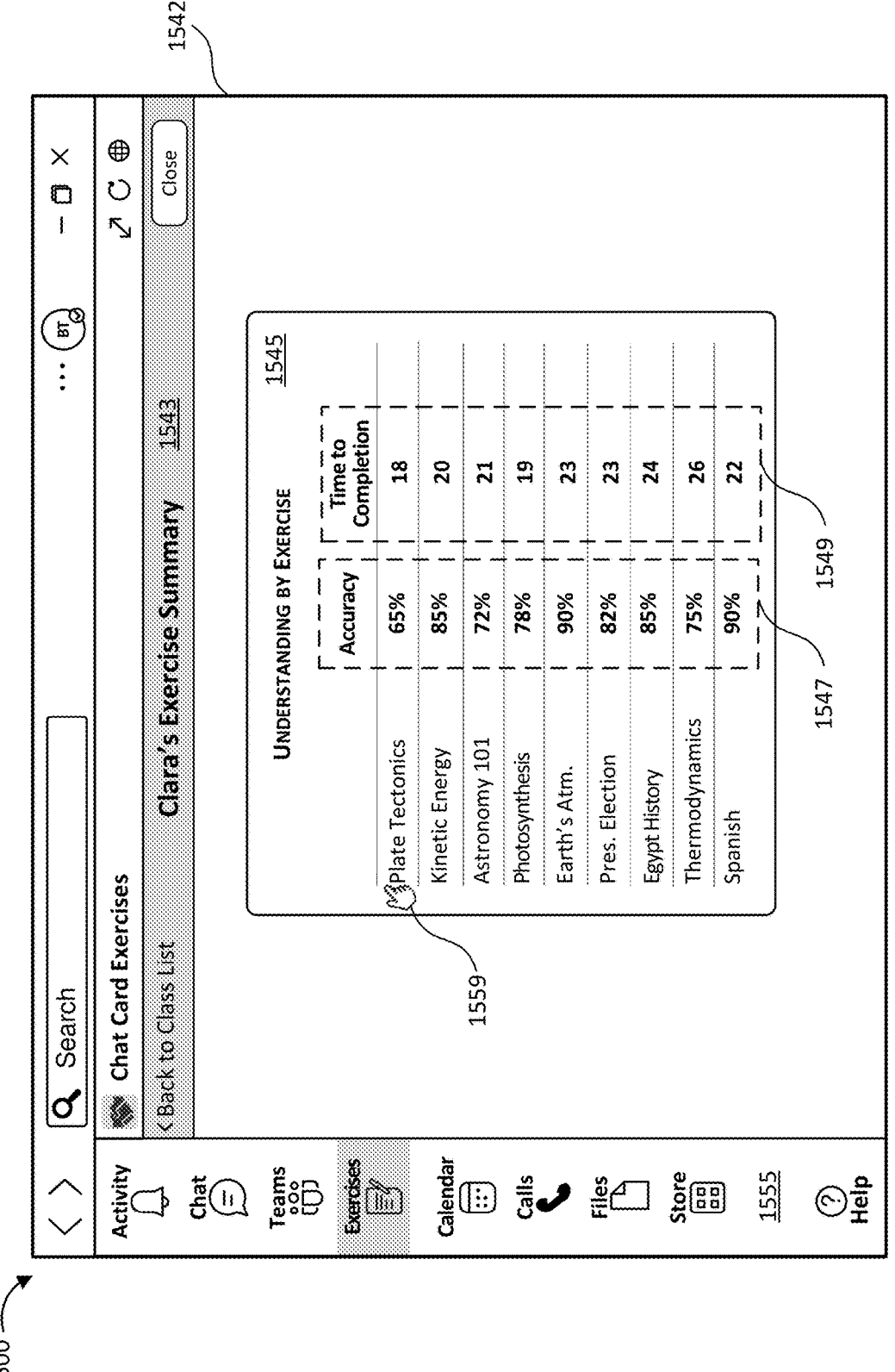
FIG. 15 provides a GUI illustrating metrics for a selected student across multiple chat card exercises, according to an embodiment herein.

In some embodiments, the educator may select a student using a cursor 1459 to view that student's metrics for each of the chat card exercises. Referring now to FIG. 15, a GUI 1500 is provided illustrating metrics for a selected student across multiple chat card exercises, according to an embodiment herein. The GUI 1500 may be provided to a reviewing user, such as an educator, by an interface 1542. The interface 1542 may include a summary 1543. The summary 1543 may include a report 1545 which includes the selected student's performance on each of the assigned or completed chat card exercises.

From report 1545, the educator can appreciate which concepts, such as Astronomy 101 or Thermodynamics, to focus future lessons on and what concepts the student understands. For example, from the report 1545, the reviewing user can view accuracy metrics 1547 for each of the chat card exercises the student completed and view performance metrics 1549. In the illustrated example, the performance metrics 1549 indicate how long it took the selected student to complete each of the chat card exercises. As can be appreciated, various metrics may be provided in the report 1545.

Referring to FIG. 16, FIG. 16 illustrates a computing system 1601 that may be used for providing a chat card engine and related functions, as described herein. For example, the client device 120 or 130 may be or include the computing system 1601. As illustrated, the computing system 1601 includes a processing system 1602 that includes a microprocessor and other circuitry that retrieves and executes software 1605 from storage system 1603. The processing system 1602 may be implemented within a single processing device but may also be distributed across multiple processing devices or sub-systems that cooperate in executing program instructions. Examples of the processing system 1602 include general purpose central processing units, graphical processing units, application specific processors, and logic devices, as well as any other type of processing device, combinations, or variations thereof.

The storage system 1603 may comprise any computer readable storage media readable by processing system 1602 and capable of storing software 1605. The storage system 1603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations the storage system 1603 may also include computer readable communication media over which at least some of the software 1605 may be communicated internally or externally. The storage system 1603 may be implemented as a single storage device but may also be implemented across multiple storage devices or sub-systems co-located or distributed relative to each other. The storage system 1603 may comprise additional elements, such as a controller capable of communicating with the processing system 1602 or possibly other systems.

The software 1605 (including chat card engine process 1606) may be implemented in program instructions and among other functions may, when executed by the processing system 1602, direct the processing system 1602 to operate as described with respect to the various operational scenarios, sequences, and processes illustrated herein. For example, the software 1605 may include program instructions for implementing a chat card engine and related functions, as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. The software 1605 may include additional processes, programs, or components, such as operating system software, virtualization software, or other application software. The software 1605 may also comprise firmware or some other form of machine-readable processing instructions executable by the processing system 1602.

In general, the software 1605 may, when loaded into the processing system 1602 and executed, transform a suitable apparatus, system, or device (of which computing system 1601 is representative) overall from a general-purpose computing system into a special-purpose computing system customized to generate features, functionality, and user experiences provided by the chat card engine. Indeed, encoding the software 1605 on the storage system 1603 may transform the physical structure of the storage system 1603. The specific transformation of the physical structure may depend on various factors in different implementations of this description. Examples of such factors may include, but are not limited to, the technology used to implement the storage media of the storage system 1603 and whether the computer-storage media are characterized as primary or secondary storage, as well as other factors.

For example, if the computer readable storage media are implemented as semiconductor-based memory, the software 1605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between the computing system 1601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Examples are described herein in the context of systems and methods for providing a chat card engine and related functions. Those of ordinary skill in the art will realize that the foregoing description is illustrative only and is not intended to be in any way limiting. Reference is made in detail to implementations of examples as illustrated in the accompanying drawings. The same reference indicators will be used throughout the drawings and the following description to refer to the same or like items.

Additionally, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure. In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a system comprising: one or more computer readable storage media; one or more processors operatively coupled with the one or more computer readable storage media; and an application comprising program instructions stored on the one or more computer readable storage media that, when executed by the one or more processors, direct a computing system to at least: receive, from a client device, an indication to start a chat card exercise; determine, by a chat card engine, a source document based on the chat card exercise; generate, by the chat card engine, a plurality of chat cards based on the source document, wherein each of the plurality of chat cards correspond to a subtopic present in the source document; generate, by the chat card engine, a first prompt based on a first subtopic; generate, by the chat card engine, a first chat card comprising the first prompt; receive, by the chat card engine, a first query from the client device responsive to the first prompt; determine, by the chat card engine, an understanding score based on the first query; generate, by the chat card engine, a second prompt based on the understanding score; and provide, by the chat card engine, the second prompt to the client device on the first chat card.

Example 2 is the system of any previous or subsequent Example, wherein the program instructions to generate, by the chat card engine, the plurality of chat cards based on the source document cause, when executed by the one or more processors, to further direct the computing system to: generate, by the chat card engine, a question prompt and a corresponding answer prompt for each respective chat card within the plurality of chat cards, wherein the first prompt comprises a respective question prompt for the first chat card.

Example 3 is the system of any previous or subsequent Example, wherein the program instructions further direct the computing system to: determine, by the chat card engine, a type of query based on the first query; and generate, by the chat card engine, the second prompt based on the type of query and the understanding score, wherein the type of query comprises: an example query, an off-topic query, an exploratory query, and a hint request query.

Example 4 is the system of any previous or subsequent Example, wherein the program instructions further direct the computing system to: determine, by the chat card engine, a query expansion requirement based on the first query; retrieve, by the chat card engine, respective content from an external source based on the first query, wherein the respective content corresponds to the first subtopic and the first query; generate, by the chat card engine, a citation to the respective content within the external source; and generate, by the chat card engine, the second prompt based on the respective content and the understanding score, wherein the second prompt comprises the citation.

Example 5 is the system of any previous or subsequent Example, wherein the program instructions to determine, by the chat card engine, the understanding score based on the first query cause, when executed by the one or more processors, the program instructions to further direct the computing system to: determine, by an understanding module, the understanding score based on an interaction history between the client device and the chat card engine within the first chat card and the first subtopic of the first chat card.

Example 6 is the system of any previous or subsequent Example, wherein the second prompt comprises content relating to the subtopic from the source document; and the program instructions further direct the computing system to generate, by the chat card engine, a citation to the content within the source document.

Example 7 is a method comprising: receiving, from a client device, an indication to start a chat card exercise; determining, by a chat card engine, a source document based on the chat card exercise; generating, by the chat card engine, a plurality of chat cards based on the source document, wherein each of the plurality of chat cards correspond to subtopic present in the source document; generating, by the chat card engine, a first prompt based on a first subtopic;

providing, by the chat card engine, a first chat card comprising the first prompt to the client device, wherein the plurality of chat cards comprises the first chat card; receiving, by the chat card engine, a first query from the client device responsive to the first prompt; determining, by the chat card engine, an understanding score based on the first query; generating, by the chat card engine, a second prompt based on the understanding score; and providing, by the chat card engine, the second prompt to the client device on the first chat card.

Example 8 is the method of any previous or subsequent Example, wherein: generating, by the chat card engine, the plurality of chat cards based on the source document further comprises: generating, by the chat card engine, a question prompt and an answer prompt for each respective chat card within the plurality of chat cards, wherein the first prompt comprises a respective question prompt for the first chat card; and determining, by the chat card engine, the understanding score based on the first query comprises: comparing, by the chat card engine, the first query to a corresponding answer prompt to the first prompt; and determining, by the chat card engine, the understanding score based on the comparison of the first query to the corresponding answer prompt for the first chat card.

Example 9 is the method of any previous or subsequent Example, the method further comprising: determining, by the chat card engine, a query expansion requirement based on the first query; retrieving, by the chat card engine, respective content from an external source based on the first query, wherein the respective content corresponds to the first subtopic and the first query; and generating, by the chat card engine, the second prompt based on the respective content and the understanding score.

Example 10 is the method of any previous or subsequent Example, the method further comprising: performing, by the chat card engine, a validation process on the second prompt prior to providing the second prompt to the client device, wherein the validation process comprises a content moderation process and a schema validation process.

Example 11 is the method of any previous or subsequent Example, the method further comprising: receiving, by the chat card engine, a hint query from the client device; and generating, by the chat card engine, a hint responsive to the hint query, wherein the hint is based on the first subtopic and an interaction history between the client device and the chat card engine within the first chat card.

Example 12 is the method of any previous or subsequent Example, the method further comprising: receiving, by the chat card engine, a second query from the client device responsive to the second prompt; determining, by the chat card engine, a second understanding score based on the second query; generating, by the chat card engine, a third prompt based on the understanding score; and providing, by the chat card engine, the third prompt to the client device on the first chat card.

Example 13 is the method of any previous or subsequent Example, wherein the understanding score is determined to be an advancing understanding, and the method further comprises: generating, by the chat card engine, a third prompt based on a second subtopic; generating, by the chat card engine, a second chat card comprising the third prompt; receiving, by the chat card engine, a second query from the client device responsive to the third prompt; determining, by the chat card engine, a second understanding score based on the second query; generating, by the chat card engine, a fourth prompt based on the second understanding score; and providing, by the chat card engine, the fourth prompt to the client device on the second chat card.

Example 14 is the method of any previous or subsequent Example, the method further comprising: determining, by the chat card engine, an understanding score for each of the plurality of chat card; and generating, by the chat card engine, a grade for the chat card exercise based on the understanding score for each of the plurality of chat cards within the chat card exercise.

Example 15 is a computer readable storage media comprising processor-executable instructions configured to cause one or more processors to: receive, from a client device, an indication to start a chat card exercise; determine, by a chat card engine, a source document based on the chat card exercise; generate, by the chat card engine, a plurality of chat cards based on the source document, wherein each of the plurality of chat cards correspond to a subtopic present in the source document; generate, by the chat card engine, a first prompt based on a first subtopic; generate, by the chat card engine, a first chat card comprising the first prompt; receive, by the chat card engine, a first query from the client device responsive to the first prompt; determine, by the chat card engine, an understanding score based on the first query; generate, by the chat card engine, a second prompt based on the understanding score; and provide, by the chat card engine, the second prompt to the client device on the first chat card.

Example 16 is the computer readable storage media of any previous or subsequent Example, wherein: the processor-executable instructions to generate, by the chat card engine, the plurality of chat cards based on the source document cause the one or more processors to further execute processor-executable instructions stored in the computer readable storage media to: generate, by the chat card engine, a question prompt and an answer prompt for each respective chat card within the plurality of chat cards, wherein the first prompt comprises a respective question prompt for the first chat card; and the processor-executable instructions to determine, by the chat card engine, the understanding score based on the first query cause the one or more processors to further execute processor-executable instructions stored in the computer readable storage media to: compare, by the chat card engine, the first query to a corresponding answer prompt to the first prompt; determine, by the chat card engine, a query expansion requirement based on the comparison of the first query to the corresponding answer prompt for the first chat card; retrieve, by the chat card engine, respective content from an external source based on the first query based on the query expansion requirement, wherein the respective content corresponds to the first subtopic and the first query; and compare, by the chat card engine, the first query to the respective content from the external source.

Example 17 is the computer readable storage media of any previous or subsequent Example, wherein the processor-executable instructions cause the one or more processors to further execute processor-executable instructions stored in the computer readable storage media to: perform, by the chat card engine, a validation process on the second prompt prior to providing the second prompt to the client device, wherein the validation process comprises one or more quality metrics.

Example 18 is the computer readable storage media of any previous or subsequent Example, wherein the processor-executable instructions cause the one or more processors to further execute processor-executable instructions stored in the computer readable storage media to: determine, by the chat card engine, an understanding score for each of the plurality of chat cards within the chat card exercise; and determine, by the chat card engine, a grade the chat card exercise based on the understanding score for each of the plurality of chat cards.

Example 19 is the computer readable storage media of any previous or subsequent Example, wherein: the processor-executable instructions cause the one or more processors to further execute processor-executable instructions stored in the computer readable storage media to: determine, by the chat card engine, that the first query is an off-topic query; and the processor-executable instructions to generate, by the chat card engine, the second prompt cause the one or more processors to further execute processor-executable instructions stored in the computer readable storage media to: generate, by the chat card engine, a redirecting prompt, wherein the redirecting prompt comprises content relating to the first subtopic.

Example 20 is the computer readable storage media of any previous or subsequent Example, wherein the processor-executable instructions cause the one or more processors to further execute processor-executable instructions stored in the computer readable storage media to: determine, by the chat card engine, a query expansion requirement based on the first query; retrieve, by the chat card engine, respective content from an external source based on the first query, wherein the respective content corresponds to the first subtopic and the first query; and generate, by the chat card engine, the second prompt based on the respective content and the understanding score.

What is claimed is:

1. A system comprising:

one or more computer readable storage media;

one or more processors operatively coupled with the one or more computer readable storage media; and an application comprising program instructions stored on the one or more computer readable storage media that, when executed by the one or more processors, direct a computing system to at least:

receive, from a client device, an indication to start a chat card exercise;

determine, by a chat card engine, a source document based on the chat card exercise;

determine, by the chat card engine, a plurality of subtopics within the source document;

generate, by the chat card engine, a plurality of chat cards based on the source document, wherein each of the plurality of chat cards corresponds to a respective subtopic of the plurality of subtopics present in the source document;

generate, by a virtual assistant integrated with the chat card engine and configured as an artificial intelligence (AI) tutor, a first prompt based on a first subtopic;

generate, by the chat card engine via the virtual assistant, a first chat card comprising the first prompt;

receive, by the chat card engine via the virtual assistant, a first query from the client device responsive to the first prompt;

generate, by a Large Language Model (LLM) operably coupled with the chat card engine, an understanding score based on an interaction history within the first chat card, wherein the interaction history comprises at least the first query and the first prompt;

generate, by the chat card engine via the virtual assistant, a second prompt based on the understanding score; and provide, by the chat card engine via the virtual assistant, the second prompt to the client device on the first chat card.

2. The system of claim 1, wherein the program instructions to generate, by the chat card engine, the plurality of chat cards based on the source document cause, when executed by the one or more processors, to further direct the computing system to:

generate, by the chat card engine, a question prompt and a corresponding answer prompt for each respective chat card within the plurality of chat cards, wherein the first prompt comprises a respective question prompt for the first chat card.

3. The system of claim 1, wherein the program instructions further direct the computing system to:

determine, by the chat card engine, a type of query based on the first query; and generate, by the chat card engine, the second prompt based on the type of query and the understanding score, wherein the type of query comprises: an example query, an off-topic query, an exploratory query, and a hint request query.

4. The system of claim 1, wherein the program instructions further direct the computing system to:

determine, by the chat card engine, a query expansion requirement based on the first query;

retrieve, by the chat card engine, respective content from an external source based on the first query, wherein the respective content corresponds to the first subtopic and the first query;

generate, by the chat card engine, a citation to the respective content within the external source; and generate, by the chat card engine, the second prompt based on the respective content and the understanding score, wherein the second prompt comprises the citation.

5. The system of claim 1, wherein the program instructions to determine, by the chat card engine, the understanding score based on the first query cause, when executed by the one or more processors, the program instructions to further direct the computing system to:

determine, by an understanding module, the understanding score based on an interaction history between the client device and the chat card engine within the first chat card and the first subtopic of the first chat card.

6. The system of claim 1, wherein the second prompt comprises content relating to the subtopic from the source document; and the program instructions further direct the computing system to generate, by the chat card engine, a citation to the content within the source document.

7. A method comprising:

receiving, from a client device, an indication to start a chat card exercise;

determining, by a chat card engine, a source document based on the chat card exercise;

determine, by the chat card engine, a plurality of subtopics within the source document;

generating, by the chat card engine, a plurality of chat cards based on the source document, wherein each of the plurality of chat cards correspond to a respective subtopic of the plurality of subtopics present in the source document;

generating, by a virtual assistant integrated with the chat card engine and configured as an artificial intelligence (AI) tutor, a first prompt based on a first subtopic;

providing, by the chat card engine via the virtual assistant, a first chat card comprising the first prompt to the client device, wherein the plurality of chat cards comprises the first chat card;

receiving, by the chat card engine via the virtual assistant, a first query from the client device responsive to the first prompt;

generating, by a Large Language Model (LLM) operably coupled with the chat card engine, an understanding score based on an interaction history within the first chat card, wherein the interaction history comprises at least the first query and the first prompt;

generating, by the chat card engine via the virtual assistant, a second prompt based on the understanding score; and providing, by the chat card engine via the virtual assistant, the second prompt to the client device on the first chat card.

8. The method of claim 7, wherein:

generating, by the chat card engine, the plurality of chat cards based on the source document further comprises:

generating, by the chat card engine, a question prompt and an answer prompt for each respective chat card within the plurality of chat cards, wherein the first prompt comprises a respective question prompt for the first chat card; and determining, by the chat card engine, the understanding score based on the first query comprises:

comparing, by the chat card engine, the first query to a corresponding answer prompt to the first prompt; and determining, by the chat card engine, the understanding score based on the comparison of the first query to the corresponding answer prompt for the first chat card.

9. The method of claim 7, the method further comprising:

determining, by the chat card engine, a query expansion requirement based on the first query;

retrieving, by the chat card engine, respective content from an external source based on the first query, wherein the respective content corresponds to the first subtopic and the first query; and generating, by the chat card engine, the second prompt based on the respective content and the understanding score.

10. The method of claim 7, the method further comprising:

performing, by the chat card engine, a validation process on the second prompt prior to providing the second prompt to the client device, wherein the validation process comprises a content moderation process and a schema validation process.

11. The method of claim 7, the method further comprising:

receiving, by the chat card engine, a hint query from the client device; and generating, by the chat card engine, a hint responsive to the hint query, wherein the hint is based on the first subtopic and an interaction history between the client device and the chat card engine within the first chat card.

12. The method of claim 7, the method further comprising:

receiving, by the chat card engine, a second query from the client device responsive to the second prompt;

determining, by the chat card engine, a second understanding score based on the second query;

generating, by the chat card engine, a third prompt based on the understanding score; and providing, by the chat card engine, the third prompt to the client device on the first chat card.

13. The method of claim 7, wherein the understanding score is determined to be an advancing understanding, and the method further comprises:

generating, by the chat card engine, a third prompt based on a second subtopic;

generating, by the chat card engine, a second chat card comprising the third prompt;

receiving, by the chat card engine, a second query from the client device responsive to the third prompt;

determining, by the chat card engine, a second understanding score based on the second query;

generating, by the chat card engine, a fourth prompt based on the second understanding score; and providing, by the chat card engine, the fourth prompt to the client device on the second chat card.

14. The method of claim 7, the method further comprising:

determining, by the chat card engine, an understanding score for each of the plurality of chat card; and generating, by the chat card engine, a grade for the chat card exercise based on the understanding score for each of the plurality of chat cards within the chat card exercise.

15. A computer readable storage media comprising processor-executable instructions configured to cause one or more processors to:

receive, from a client device, an indication to start a chat card exercise;

determine, by a chat card engine, a source document based on the chat card exercise;

determine, by the chat card engine, a plurality of subtopics within the source document;

generate, by the chat card engine, a plurality of chat cards based on the source document, wherein each of the plurality of chat cards corresponds to a respective subtopic of the plurality of subtopics present in the source document;

generate, by a virtual assistant integrated with the chat card engine and configured as an artificial intelligence (AI) tutor, a first prompt based on a first subtopic;

generate, by the chat card engine via the virtual assistant, a first chat card comprising the first prompt;

receive, by the chat card engine via the virtual assistant, a first query from the client device responsive to the first prompt;

generate, by a Large Language Model (LLM) operably coupled with the chat card engine, an understanding score based on an interaction history within the first chat card, wherein the interaction history comprises at least the first query and the first prompt;

generate, by the chat card engine via the virtual assistant, a second prompt based on the understanding score; and provide, by the chat card engine via the virtual assistant, the second prompt to the client device on the first chat card;

generate, by the chat card engine via the virtual assistant, a second prompt based on the understanding score; and provide, by the chat card engine via the virtual assistant, the second prompt to the client device on the first chat card.

16. The computer readable storage media of claim 15, wherein:

the processor-executable instructions to generate, by the chat card engine, the plurality of chat cards based on the source document cause the one or more processors to further execute processor-executable instructions stored in the computer readable storage media to:

generate, by the chat card engine, a question prompt and an answer prompt for each respective chat card within the plurality of chat cards, wherein the first prompt comprises a respective question prompt for the first chat card; and the processor-executable instructions to determine, by the chat card engine, the understanding score based on the first query cause the one or more processors to further execute processor-executable instructions stored in the computer readable storage media to:

compare, by the chat card engine, the first query to a corresponding answer prompt to the first prompt;

determine, by the chat card engine, a query expansion requirement based on the comparison of the first query to the corresponding answer prompt for the first chat card;

retrieve, by the chat card engine, respective content from an external source based on the first query based on the query expansion requirement, wherein the respective content corresponds to the first subtopic and the first query; and compare, by the chat card engine, the first query to the respective content from the external source.

17. The computer readable storage media of claim 15, wherein the processor-executable instructions cause the one or more processors to further execute processor-executable instructions stored in the computer readable storage media to:

perform, by the chat card engine, a validation process on the second prompt prior to providing the second prompt to the client device, wherein the validation process comprises one or more quality metrics.

18. The computer readable storage media of claim 15, wherein the processor-executable instructions cause the one or more processors to further execute processor-executable instructions stored in the computer readable storage media to:

determine, by the chat card engine, an understanding score for each of the plurality of chat cards within the chat card exercise; and determine, by the chat card engine, a grade the chat card exercise based on the understanding score for each of the plurality of chat cards.

19. The computer readable storage media of claim 15, wherein:

the processor-executable instructions cause the one or more processors to further execute processor-executable instructions stored in the computer readable storage media to:

determine, by the chat card engine, that the first query is an off-topic query; and the processor-executable instructions to generate, by the chat card engine, the second prompt cause the one or more processors to further execute processor-executable instructions stored in the computer readable storage media to:

generate, by the chat card engine, a redirecting prompt, wherein the redirecting prompt comprises content relating to the first subtopic.

20. The computer readable storage media of claim 15, wherein the processor-executable instructions cause the one or more processors to further execute processor-executable instructions stored in the computer readable storage media to:

determine, by the chat card engine, a query expansion requirement based on the first query;

retrieve, by the chat card engine, respective content from an external source based on the first query, wherein the respective content corresponds to the first subtopic and the first query; and generate, by the chat card engine, the second prompt based on the respective content and the understanding score.

* * * * *